US007078720B2

(12) United States Patent
Yamaguchi

(10) Patent No.: US 7,078,720 B2
(45) Date of Patent: Jul. 18, 2006

(54) RANGE FINDER FOR MEASURING THREE-DIMENSIONAL GEOMETRY OF OBJECT AND METHOD THEREOF

(75) Inventor: Yoshinori Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 185 days.

(21) Appl. No.: 10/778,092

(22) Filed: Feb. 17, 2004

(65) Prior Publication Data
US 2005/0035314 A1    Feb. 17, 2005

(30) Foreign Application Priority Data
Aug. 12, 2003  (JP)  ............................ P.2003-292543
Sep. 4, 2003   (JP)  ............................ P. 2003-312932

(51) Int. Cl.
*G01V 8/00*        (2006.01)
(52) U.S. Cl. ........................ 250/559.38; 250/559.19; 250/559.29; 356/3.01
(58) Field of Classification Search .......... 250/559.38, 250/559.22, 559.23; 356/4.01, 4.03, 4.04, 356/4.07, 3.01
See application file for complete search history.

(56) References Cited

U.S. PATENT DOCUMENTS

| 5,056,912 | A | * | 10/1991 | Hamada et al. ............... 353/38 |
| 5,528,297 | A | * | 6/1996 | Seegert et al. ............ 348/333.1 |
| 5,726,756 | A | * | 3/1998 | Aki et al. .................... 356/630 |
| 5,783,833 | A | * | 7/1998 | Sugaya et al. ............... 250/548 |
| 6,328,447 | B1 | * | 12/2001 | Yamazaki et al. ............. 353/31 |
| 6,353,478 | B1 | * | 3/2002 | Rudd et al. .................. 356/631 |
| 6,373,612 | B1 | * | 4/2002 | Hoffman et al. ............. 359/196 |
| 6,580,495 | B1 | * | 6/2003 | Shirai .......................... 356/5.1 |
| 2001/0000972 | A1 | * | 5/2001 | Haba et al. .................... 353/34 |
| 2003/0117686 | A1 | * | 6/2003 | DiCarlo ....................... 359/291 |
| 2003/0193658 | A1 | * | 10/2003 | Uomori et al. ............... 356/3.1 |

FOREIGN PATENT DOCUMENTS

| JP | A 3-192474 | 8/1991 |
| JP | B2 2983318 | 9/1999 |
| JP | A 2000-009442 | 1/2000 |
| JP | A 2000-065542 | 3/2000 |

* cited by examiner

*Primary Examiner*—Georgia Epps
*Assistant Examiner*—Kevin Wyatt
(74) *Attorney, Agent, or Firm*—Oliff & Berridge, PLC

(57) ABSTRACT

A range finder for measuring a three-dimensional geometry of an object includes a projector unit for projecting the pattern light onto the object, a first image capturing unit for capturing an image reflected from the object, a second image capturing unit for capturing an image reflected from the object, an identical principal point arrangement unit, and an imaging optical system. Preferably, the second image capturing unit is arranged so as to assume a principal point optically differing from that of the first image capturing unit, the identical principal point arrangement unit arranges the projector unit and the first image capturing unit at the position of an optically identical principal point, and the imaging optical system is shared between the projector unit and the first image capturing unit.

30 Claims, 20 Drawing Sheets

FIG. 5
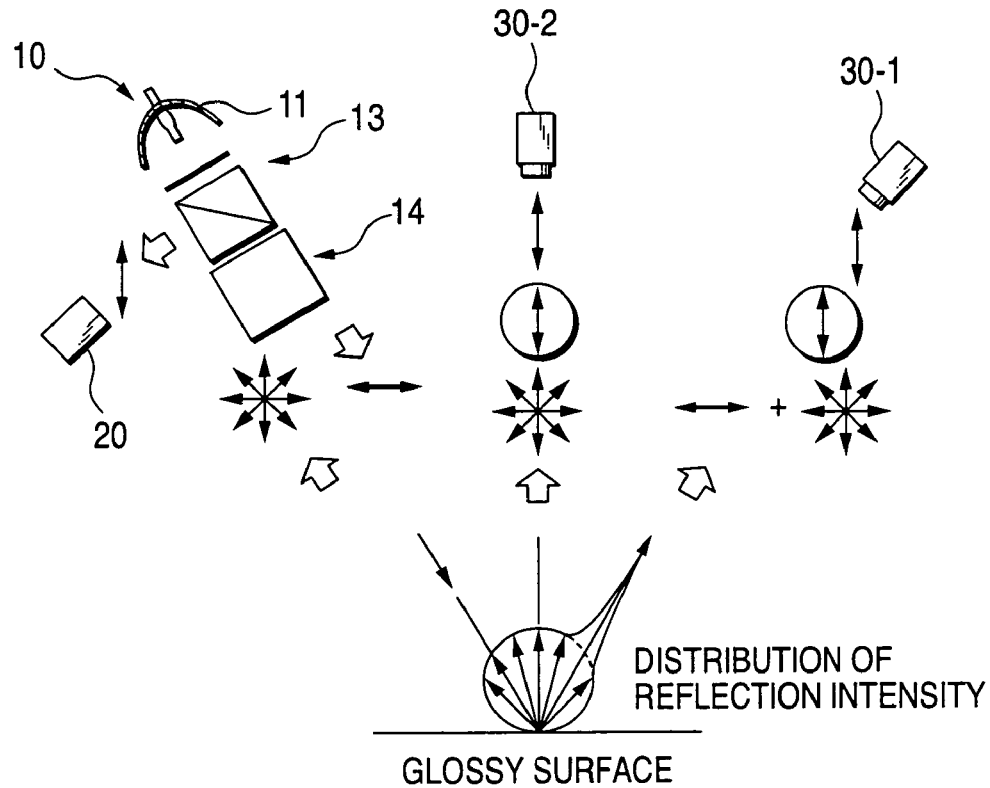
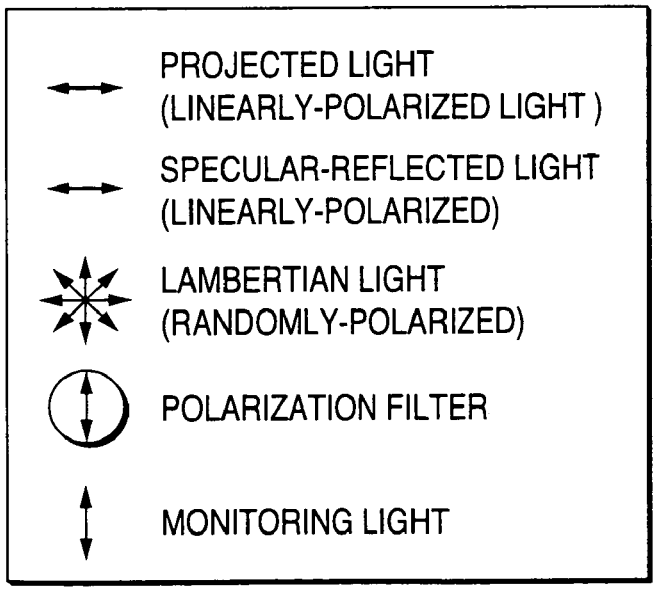

FIG. 11
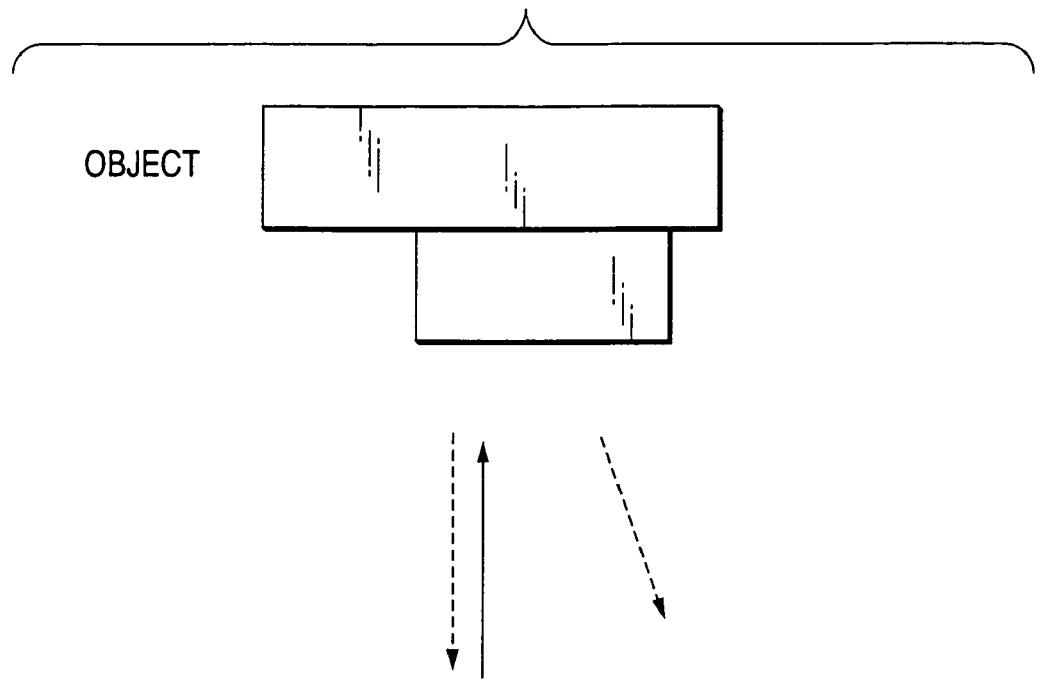
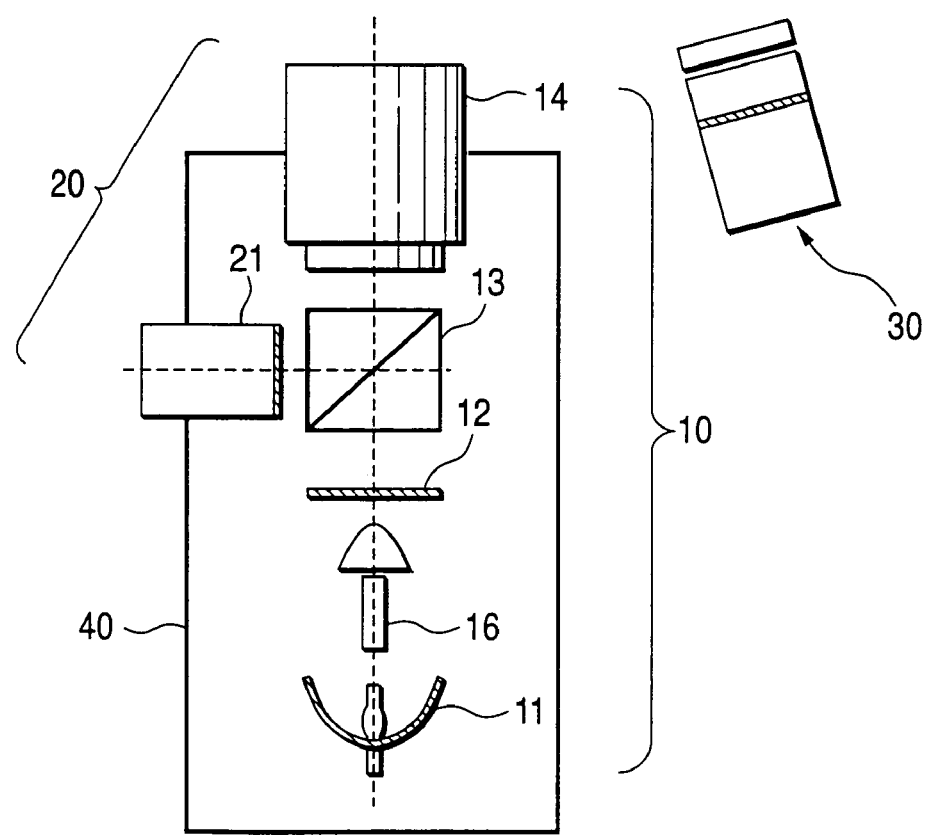

FIG. 16
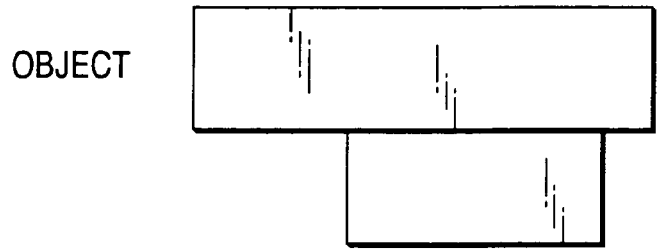
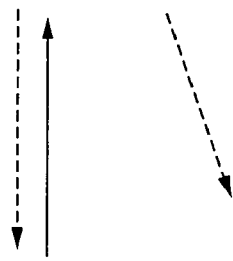
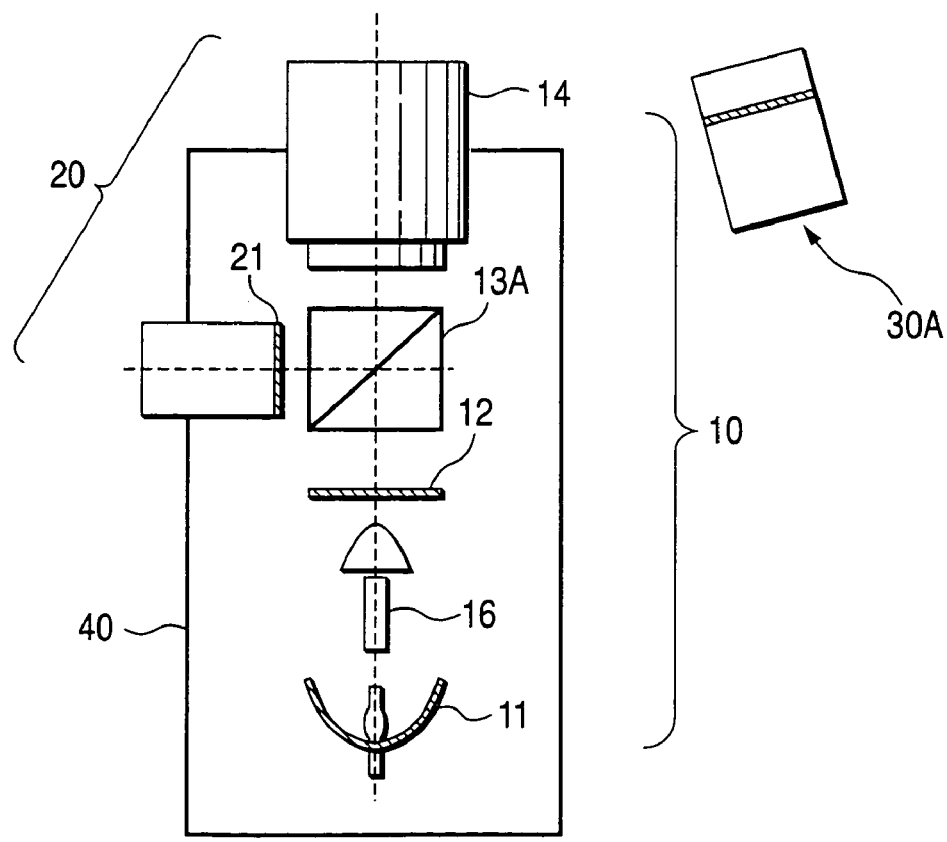

FIG. 21 Prior Art
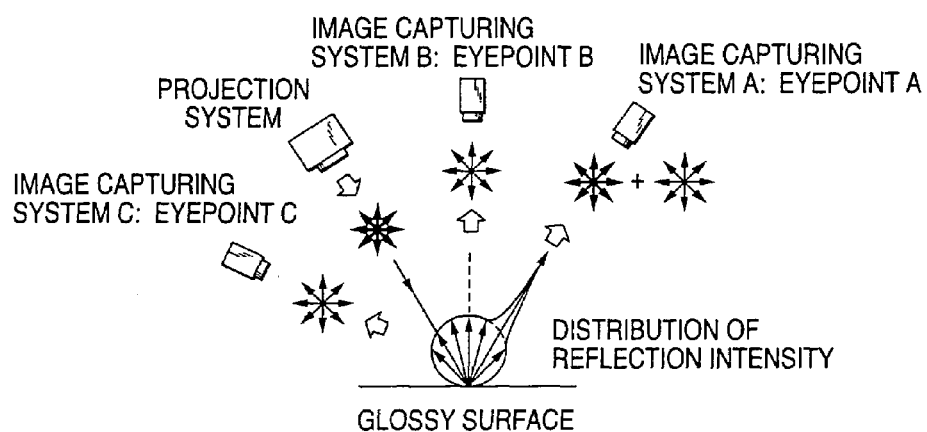
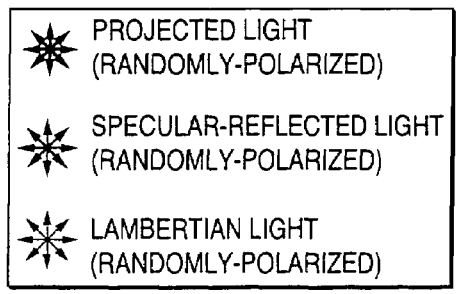

RANGE FINDER FOR MEASURING THREE-DIMENSIONAL GEOMETRY OF OBJECT AND METHOD THEREOF

BACKGROUND OF THE INVENTION

1. Field of the Invention

The present invention relates to a three-dimensional image capturing technique optimal for collectively acquiring range data as well as intensity data by means of a triangulation method and through use of a plurality of cameras, and more particularly, to an attempt to realize a reduction in measurement errors, improved usability, and a compact range finder.

2. Background Art

Techniques for measuring the geometry of an object are roughly classified into passive techniques (i.e., triangulation and shape-from-X) and active techniques (time of flight and triangulation). A difference between the passive techniques and the active techniques lies in whether or not any energy is radiated onto an object. Generally, the active techniques can be said to be more resistant to noise than the passive techniques, because ambiguity in measurement can be eliminated. The triangular technique, which belongs to both categories of active and passive techniques, is a geometrical technique which determines a range to a point of measurement located on the object on the basis of angles made between a base length and lines connecting both ends of the base length to the point of measurement. In connection with some of the active-type triangulation techniques, there has bee proposed a measurement technique for projection light of a coded stripe pattern (JP-A-3-192474). A block diagram of this technique is shown in FIG. 19. In FIG. 19, a plurality of stripe light beams encoded with colors of light by a projection system are projected onto an object, and stripe light beams originating from the object are observed by means of an image capturing system. Intensity values of the projected stripe light beams are compared with intensity values of the captured stripe light images, to thereby find the same stripe. Range data are calculated on the basis of the triangular principle.

When the object has a texture (e.g., a color or a pattern), difficulty is encountered in determining a range. Specifically, the captured stripe image is affected by the texture provided on the object and, hence, differs from the projected stripe beam in terms of color/brightness. This poses difficulty in determining which one of the projected stripe light beams corresponds to the captured stripe image. Therefore, an erroneous correspondence occurs, which in turn renders computation of a range impossible.

To solve this problem, the present inventors have conducted considerable research and eventually solved this problem by means of placing a projection system and an image capturing system at an optically-identical principal point by means of a half mirror (JP-A-2000-65542 and JP-A-2000-9442) FIG. 20 shows the configuration of this technique. Encoded stripe light is projected onto an object, and the stripe light appearing on the object is monitored through use of an image capturing system located at the same principal point as that of the projection system, and another image capturing system located at a non-principal point. The stripe image captured by the image capturing system located at the same principal point and that captured by the image capturing system located at the non-principal point include texture information about the object. Accordingly, occurrence of an error, when corresponding points are extracted by comparison between the stripe images, can be inhibited. Therefore, the influence under which measurement is deteriorated by the texture of the object can be diminished. Moreover, the texture data themselves can also be acquired accurately, whereby a three-dimensional image with a texture can be acquired.

However, when an optical system of the projection system and an optical system of the image capturing system are configured to be independent of each other as mentioned above, laborious tasks, such as those which will be mentioned below, arise when zoom ratios of the optical systems are desired to be changed in accordance with the size of an object. When a three-dimensional shape of an object is desired to be acquired with high resolution, the zoom of the optical system in the image capturing system is set to a telephoto position. Labor is required for adjusting the zoom ratio of the optical system in the projection system in accordance with the setting of the zoom of the optical system. Moreover, when the zoom ratio of the optical system in the image capturing system is desired to be changed, the position of the principal point of the optical system shifts. Therefore, very complicated tasks arise, including re-adjustment of the projection and image capturing systems, which have once been arranged in accordance with the shift, such that the optical systems of the projection and image capturing system come to an identical optical point, thereby causing a problem of deterioration of usability.

Another problem is that the characteristic of the identity of the optically principal points of the projection system and the image capturing system is realized at the half mirror, and that a strain on the half mirror influences deterioration of measurement, under the present circumstances. This is a serious problem to be solved.

Moreover, when the surface of the object has a gloss (deviation in the distribution of intensity of reflected light), a range measurement becomes difficult.

On a measurement surface having a strong characteristics of a specular finished surface, such as a measurement surface of a glossy object, specular-reflected light is observed in the direction of regular reflection. With deviation from the direction of regular reflection, the specular-reflected light diminishes. FIG. 21 is a view for describing such a reflective characteristic. The light projected from a light projection system is usually natural light, and the polarization direction of natural light is random. An image capturing system A located at the location of an eyepoint A, the eyepoint being situated in the direction of regular reflection, observes high-intensity reflected light including the specular-reflected light, as well as lambertian light. The reflected light appears in a captured image as highlight at the position of regular reflection. Therefore, the projected stripe light is observed as a stripe image having very high brightness affected by the influence of the glossy surface. Therefore, difficulty is encountered in determining which one of the projected stripe light beams corresponds to the captured stripe image. For these reasons, an erroneous correspondence arises, thereby rendering calculation of a range impossible.

Image capturing systems B, C located at the locations of eyepoints B, C, the eyepoints not being situated in the direction of regular reflection, observe reflected light including only the lambertian light. Hence, highlight does not appear in captured images. There are several cases where occurrence of erroneous correspondence is diminished by means of putting contrivance into the locations of the eyepoints as mentioned above. However, such a configuration poses a limitation on the layout of the image capturing system; that is, the configuration is incapable of adapting to measurement of a plurality of tilt measurement surfaces. Moreover, when the distribution of intensity of the specular-reflected light is not comparatively narrow differently from in FIG. 21 (i.e., a glossy object having a strong characteristic of a specular finished surface) but has a spread (i.e., a glossy object having a weak characteristic of a specular finished surface), a portion of the specular-reflected light is also observed by the image capturing system B, and calculation of a proper range is hindered by occurrence of erroneous correspondence.

FIG. 22 is a block diagram of an apparatus which attempts to eliminate the specular-reflected light by means of placing polarizing filters in front of the image capturing systems. However, even in this configuration, the reflected light having arrived at the eyepoint A situated in the direction of regular reflection is natural light having a random polarization direction. Therefore, the specular-reflected light cannot be eliminated by means of any rotational adjustment of the transmission axis of the polarizing filter. For these reasons, the aforementioned problem remains unsolved under the present circumstances.

Proposed in Japanese Patent No. 2983318 is a configuration intended for preventing deterioration of measurement when an object has a gloss as mentioned above. An illustration for explaining the configuration is shown in FIG. 23. Polarization light is generated by means of a polarized beam splitter (PBS) prism, whereupon a spot-like light beam is projected onto a glossy object. The light reflected from a glossy surface is detected by a detection section by way of the PBS prism. The light reflected from the glossy surface consists of specular-reflected light and lambertian light. The specular-reflected light is reflected by means of a characteristic of the PBS prism, and a portion of the lambertian light enters the detection section. The light having entered is detected as a point corresponding to the spot on the glossy surface. On the basis of the position detected by the detection section, the three-dimensional position of the object is calculated. If the reflected light is detected by the detection section without passing through the PBS prism, the point caused by the specular-reflected light and the point caused by the lambertian light are detected. Therefore, there arises a problem of inability to identify the three-dimensional position of the object. This configuration solves such a problem unique to the glossy object. However, this configuration involves a necessity for effecting scanning operation with projected light when the entire object is to be measured, because the projected light has a spot-like shape. For this reason, there is required an apparatus for effecting scanning operation, thereby resulting in occurrence of problems; that is, the overall measurement apparatus becoming large scale, a lot of time being consumed by scanning, poor operability, and particularly, inability to apply the object in motion.

Under the present situation, when an object is glossy, a range cannot be measured, because of the foregoing reasons, even when there is employed an optical layout characterized by the same principal point, as in the case of JP-A-2000-65542 and JP-A-2000-9442 that have been described before.

SUMMARY OF THE INVENTION

The present invention has been conceived in view of the foregoing circumstances. A first object of the invention is to provide a three-dimensional image capturing technique which prevents deterioration of measurement, which would otherwise be caused when the object has a texture or a stain in an optical system; which implements zooming of an optical system in accordance with the size of an object with a simple system; and which enables collective acquisition of a three-dimensional image of the object. A second object of the invention is to provide a three-dimensional image capturing technique which prevents deterioration of measurement, which would otherwise be caused when the object is glossy; which implements zooming of an optical system in accordance with the size of an object with a simple system; and which enables collective acquisition of a three-dimensional image of the object.

According to one aspect of the invention, in order to achieve the object there is provided a range finder for measuring a three-dimensional geometry of an object, including: a projector unit for projecting the pattern light onto the object; a first image capturing unit for capturing an image reflected from the object; a second image capturing unit for capturing an image reflected from the object; an identical principal point arrangement unit; and an imaging optical system. Preferably, the second image capturing unit is arranged so as to assume a principal point optically differing from that of the first image capturing unit; the identical principal point arrangement unit arranges the projector unit and the first image capturing unit at the position of an optically identical principal point; and the imaging optical system is shared between the projector unit and the first image capturing unit.

According to another aspect of the invention, there is provided a three-dimensional image capturing method, employing: a projector unit for projecting pattern light onto an object; a first image capturing unit for capturing an image reflected from the object; a second image capturing unit for capturing an image reflected from the object, the second image capturing unit being arranged so as to assume a principal point optically differing from that of the first image capturing unit; an identical principal point arrangement unit for arranging the projector unit and the first image capturing unit at the position of an optically identical principal point; and an imaging optical system shared between the projector unit and the first image capturing unit; the method including: projecting the pattern light projected by the projector unit onto the object; capturing an image of the reflected light with the first and second image capturing units; and measuring a three-dimensional geometry on the basis of a reflected image of the object acquired by the first image capturing unit and a reflected image of the object acquired by the second image capturing unit.

According to yet another aspect of the invention, there is provided a three-dimensional image camera for measuring a three-dimensional geometry of an object, including: a projector unit for projecting pattern light onto the object; a first image capturing unit for capturing an image reflected from the object; a second image capturing unit for capturing an image reflected from the object; an identical principal point arrangement unit; an imaging optical system; and a housing. Preferably, the second image capturing unit is arranged so as to assume a principal point optically differing from that of the first image capturing unit; the identical principal point arrangement unit arranges the projector unit and the first image capturing unit at the position of an optically identical principal point; the imaging optical system is shared between the projector unit and the first image capturing unit; and the housing mounts the projector unit, the first image capturing unit, and the second image capturing unit.

According to yet another aspect of the invention, there is provided a range finder for measuring a three-dimensional geometry of an object, including: a projector unit for projecting pattern light onto the object; a first image capturing unit for capturing an image reflected from the object; a second image capturing unit for capturing an image reflected from the object; an identical principal point arrangement unit; and an imaging optical system. Preferably, the second image capturing unit is arranged so as to assume a principal point optically differing from that of the first image capturing unit; the identical principal point arrangement unit arranges the projector unit and the first image capturing unit at the position of an optically identical principal point; the imaging optical system is shared between the projector unit and the first image capturing unit; the identical principal point arrangement unit further has a polarization conversion function for converting light originating from the projector unit into polarization light, and a polarization light direction selection function for selecting; and light to be guided to the first image capturing unit is selected from among light reflected from the object by the polarization conversion function.

According to still another aspect of the invention, there is provided a three-dimensional image capturing method, employing: a projector unit for projecting pattern light onto an object; a first image capturing unit for capturing an image reflected from the object; a second image capturing unit for capturing an image reflected from the object, the second image capturing unit being arranged so as to assume a principal point optically differing from that of the first image capturing unit; an identical principal point arrangement unit for arranging the projector unit and the first image capturing unit at the position of an optically identical principal point; and an imaging optical system shared between the projector unit and the first image capturing unit; the method including: converting light originating from the projector unit into polarization light by a polarization conversion function of the identical principal point arrangement unit; selecting from among light reflected from the object light to be guided to the first image capturing unit by a polarization direction selection function provided in the identical principal point arrangement unit; selecting from among light reflected from the object light to be guided to the second image capturing unit by a polarization direction selection unit provided in the second image capturing unit; and measuring a three-dimensional geometry on the basis of a reflected image of the object acquired by the first image capturing unit and a reflected image of the object acquired by the second image capturing unit.

According to yet another aspect of the invention, there is provided a three-dimensional image camera for measuring a three-dimensional geometry of an object, including: a projector unit for projecting pattern light onto the object; a first image capturing unit for capturing an image reflected from the object; a second image capturing unit for capturing an image reflected from the object; an identical principal point arrangement unit; an imaging optical system; and a housing. Preferably, the second image capturing unit is arranged so as to assume a principal point optically differing from that of the first image capturing unit; the identical principal point arrangement unit arranges the projector unit and the first image capturing unit at the position of an optically identical principal point; the imaging optical system is shared between the projector unit and the first image capturing unit; the housing mounts the projector unit, the first image capturing unit, and the second image capturing unit; the identical principal point arrangement unit further has a polarization conversion function for converting light originating from the projector unit into polarization light, and a polarization light direction selection function; and light to be guided to the first image capturing unit is selected from among light reflected from the object by the polarization light direction selection function.

BRIEF DESCRIPTION OF THE DRAWINGS

The invention maybe more readily described with reference to the accompanying drawings:

FIG. 5 is a view for describing that deterioration of measurement can be prevented in Embodiment 1 even when an object is glossy;

FIG. 11 is a view for describing a range finder according to Embodiment 3 of the invention;

FIG. 16 is a view for describing a range finder according to Embodiment 8 of the invention;

FIG. 21 is a view for describing that the related-art range finder causes deterioration in measurement when the object is glossy;

DETAILED DESCRIPTION OF THE PREFERRED EMBODIMENTS

Embodiments of the invention will be specifically described hereinbelow by reference to the drawings.

Figure 1:
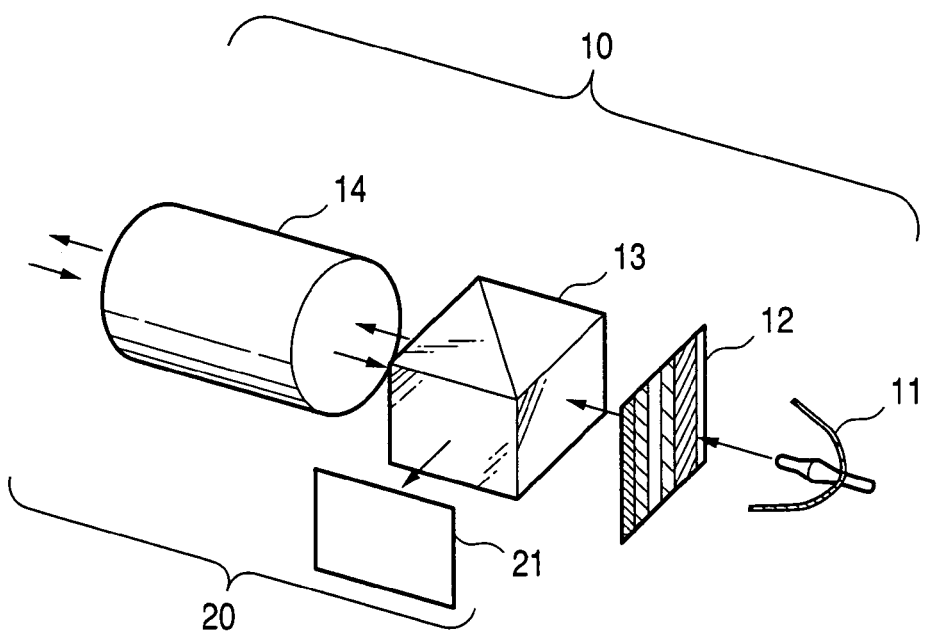
FIG. 1 is a view schematically showing projector unit and first image capturing unit located at a principal point optically identical with that of projector unit, both units being principal features of Embodiment 1 of the invention.
Figure 4:
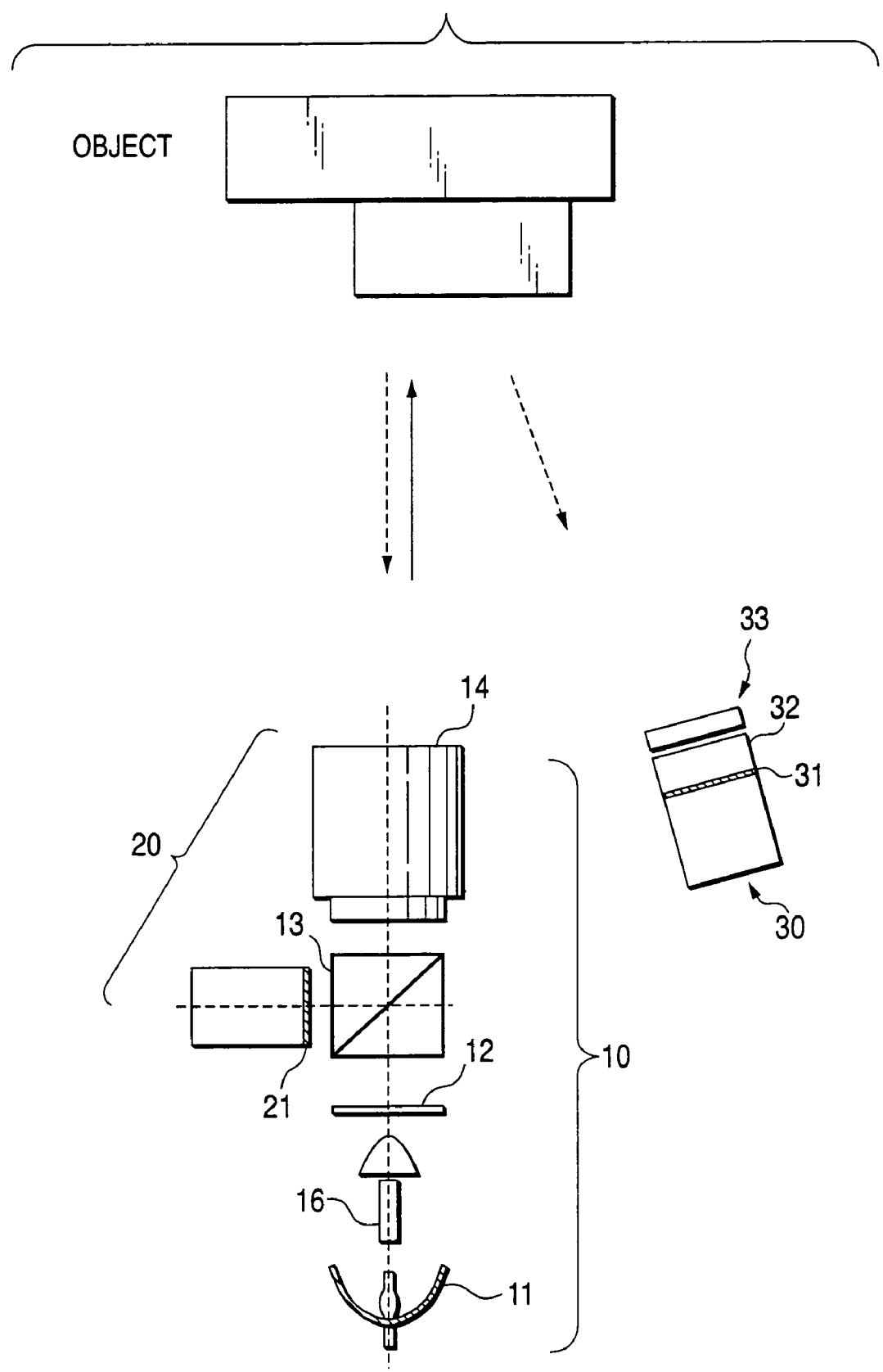
FIG. 4 is a view showing the overall configuration of a range finder of Embodiment 1.

FIG. 1 schematically shows projector unit 10 which is the principal feature of a range finder according to Embodiment 1 of the invention; and first image capturing unit 20 located at a principal point optically identical with that of the projector unit 10. The schematic configuration of the entirety of the range finder of the present embodiment is shown in FIG. 4, and the configuration will be described later.

In FIG. 1, the projector unit 10 comprises a light source 11 for emitting light; a pattern generation section 12 for generating an encoded pattern; identical principal point arrangement unit 13 for placing the projector unit 10 at the principal point optically identical with that of first image capturing unit 20; and an image forming optical system 14 shared between the projector unit 10 and the first image capturing unit 20. A liquid-crystal panel or a transmitted film is used for the pattern generation section 12. If a liquid-crystal panel is used, the contrast or color of stripes constituting a pattern or a pitch between the strips is easily changed. Hence, ease of operation is achieved even when the pattern is changed in accordance with an object desired to be subjected to three-dimensional measurement. A plurality of sets of transmitted films, which differ from each other in terms of contrast, color, or a stripe pitch, are formed beforehand. The films are exchanged according to an object. The stripes are encoded through use of a difference in contrast and color. There may also be employed stripe patterns which differ in transmission factor from each other, by means of forming dots—which are different in size and pitch—on a transparent member, such as glass, in place of the transmitted film or changing the area ratio of dots.

The first image capturing unit 20 comprises the identical principal point arrangement unit 13, which places a texture pattern image capturing section 21 for capturing the texture of the object and a pattern image reflected from the object on the optical principal point optically identical with that of the projector unit 10; and the imaging optical system 14 shared between the first image capturing unit 20 and the projector unit 10. Three-dimensional geometrical measurement is effected on the basis of the image acquired by the texture pattern image capturing section 21.

Figure 8:
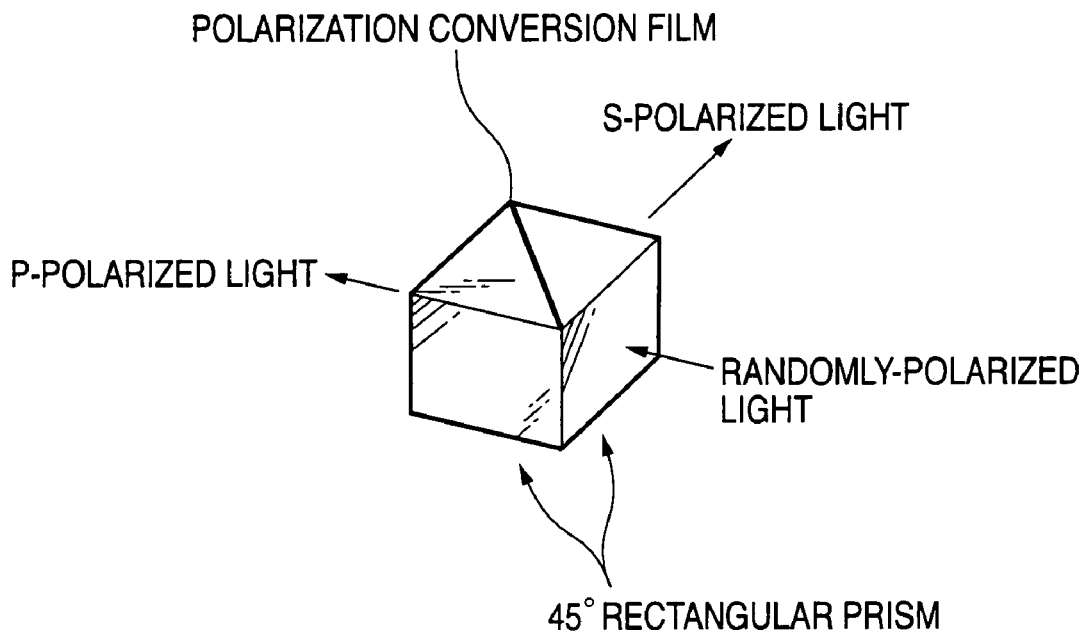
FIG. 8 is a view for describing an example of a PBS prism to be employed in Embodiment 1.

A polarized beam splitter (PBS) prism is used for the identical principal point arrangement unit 13. This prism is a cube-type beam splitter and has the function of converting natural light, which is randomly-polarization light, into linearly-polarized light. As shown in FIG. 8, for instance, the PBS prism has a polarization conversion film interposed between a pair of 45° rectangular prisms. In the present embodiment, the PBS prism is arranged such that the projector unit 10 is placed on the optical principal point identical with that of the first image capturing unit 20. Detailed explanations for placing the projector unit 10 and the first image capturing unit 20 will be provided later. The imaging optical system 14 is disposed ahead of the beam splitter (i.e., a position proximate to the object). The light originating from the light source 11 (i.e., randomly-polarization light) passes through the pattern generation section 12 and enters the PBS prism (the identical principal point arrangement unit 13). The light is divided into light which travels rectilinearly toward the imaging optical system 14 by means of the PBS prism and light which travels in a direction perpendicular to the traveling direction of the light (i.e., the direction opposite to the direction of the texture pattern image capturing section 21). The two light beams have already been converted into linearly-polarized beams, and the directions in which the light beams are polarized are perpendicular to each other.

Figure 2:
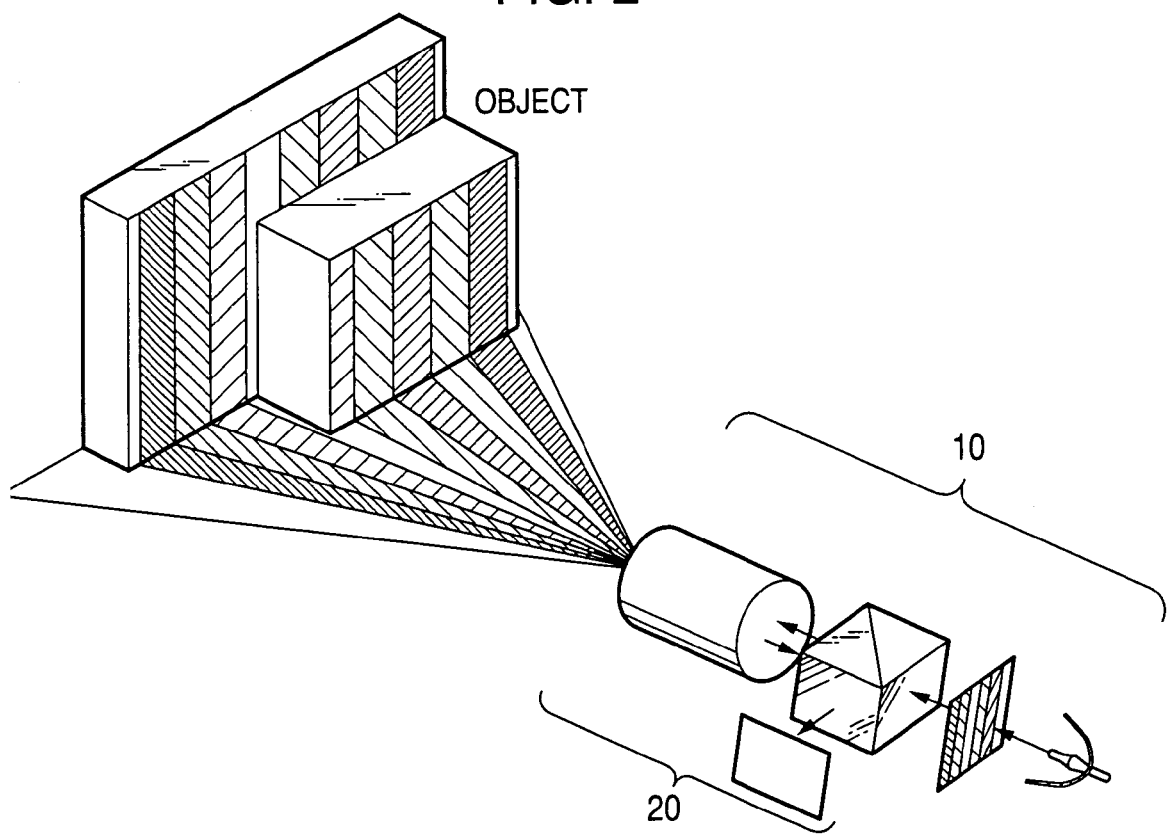
FIG. 2 is a view for describing projection and capture of pattern light encoded by the configuration of an identical principal point of Embodiment 1.

FIG. 2 shows an illustration for describing collective projection of the encoded pattern light beam that has been polarized and converted on the object and capture of an image of the object. The polarized pattern light beam that has originated from the pattern generation section 12 and encoded by means of contrast or a color passes through the PBS prism (the identical point arrangement unit 13), and a portion of the polarized pattern light beam is converged as an image on the object by way of the imaging optical system 14. A portion of the pattern reflected light beam on the objective is converted as an image on the texture pattern image capturing section 21 in the first image capturing unit 20 by means of the PBS prism (the identical principal point arrangement unit 13) after having again traveled through the imaging optical system 14. The pattern reflected light that has been converged into an image is subjected to image conversion performed by the image capturing section 21, whereby a reflected pattern image is acquired.

Figure 3:
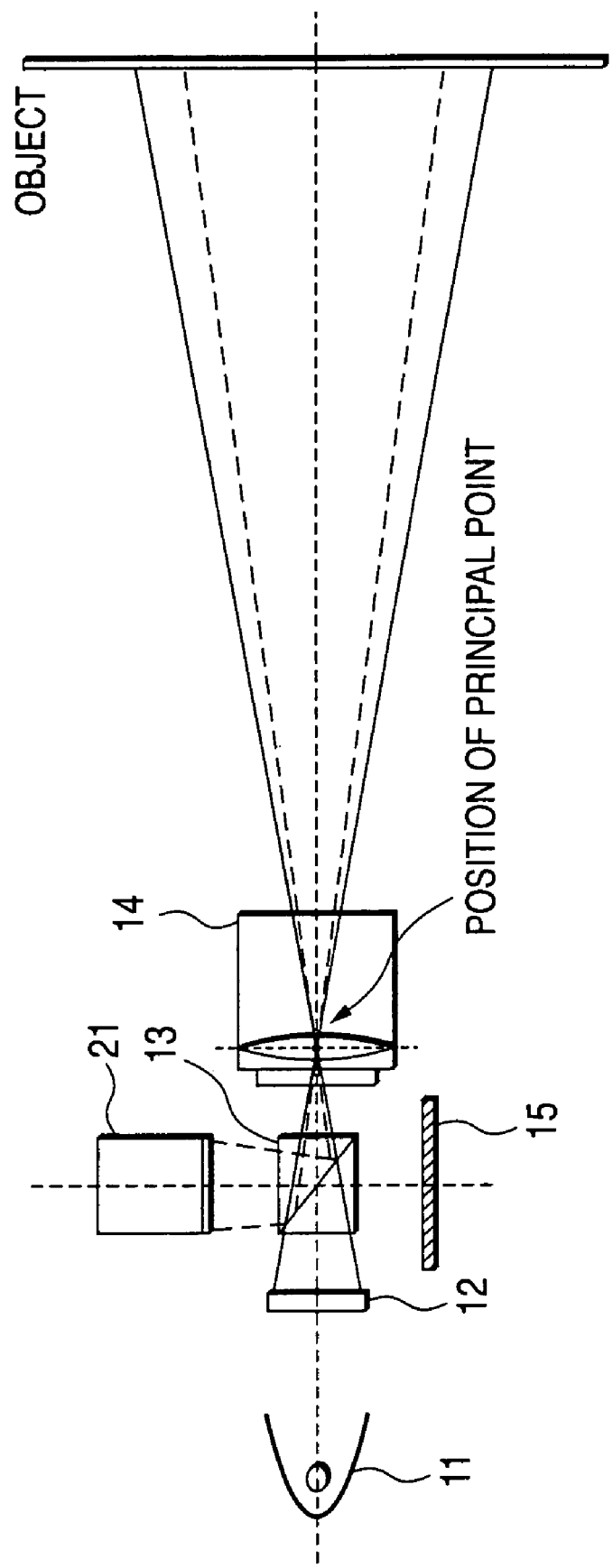
FIG. 3 is a view for describing that the projector unit and the first image capturing unit can be placed at optically identical principal points in Embodiment 1.

FIG. 3 is a view for describing that the projector unit 10 and the first image capturing unit 20 can be arranged on the identical optical principal point.

First, the position of the principal point of the imaging optical system 14 is adjusted such that an imaging relationship exists between the position of the pattern generation section 12 and the position of the object (the position of the pattern generation section 12 may also be adjusted). Next, the image capturing section 21 is arranged such that an optical range from the position of the principal point of the imaging optical system 14 to the image capturing section 21 by way of the PBS prism (i.e., the identical point arrangement unit 13) becomes equivalent to an optical range from the position of the principal point of the imaging optical system 14 to the pattern generation section 12. Further, an imaging relationship exists between the position of the object and the position of the image capturing section 21. The operations that have been described thus far are preferably performed along the direction of the optical axis of the imaging optical system. However, the operations may slightly deviate from the direction of the optical axis; in such a case no substantial problem arises, so long as the range from the position of the principal point to the imaging optical system 14 is constant.

For the sake of simple explanation, in FIG. 3 an image capturing area is drawn so as to be smaller than a projection area in FIG. 3. As a matter of course, the two areas may be made equal to each other. In this case, the area of the texture pattern image capturing section 21 and that of the pattern generation section 12 are made identical with each other. An illustrated optical trap 15 is arranged for eliminating the light that has been divided by the PBS prism (the identical principal point arrangement unit 13) and has not been projected onto the object and returned, from among the light beams emitted from the pattern generation section.

Figure 20:
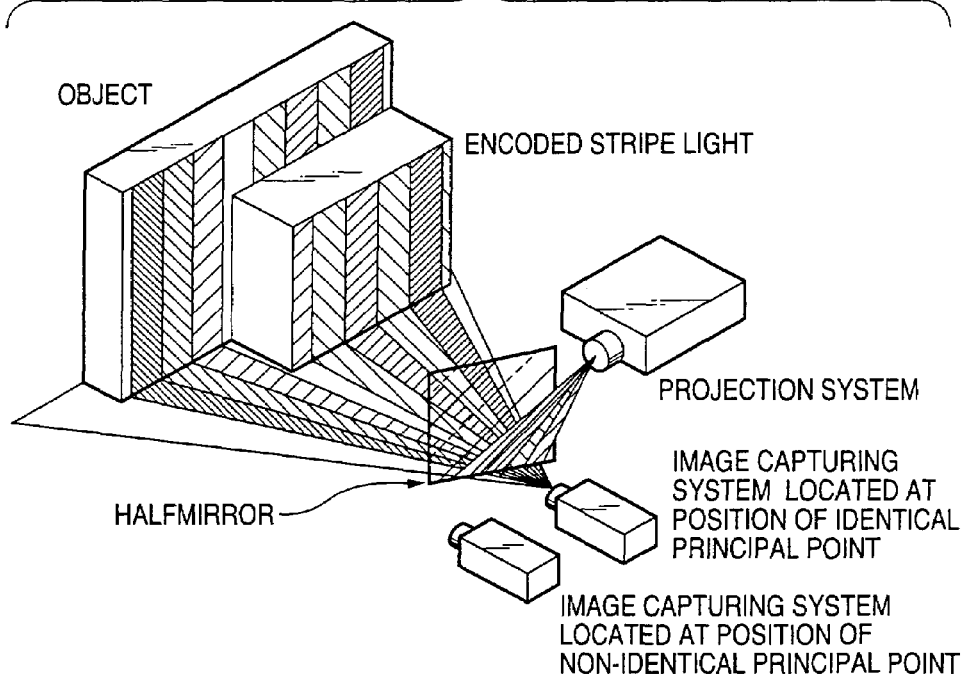
FIG. 20 is a view for describing that deterioration of measurement can be prevented by the related-art range finder when the object has a texture.
Figure 22:
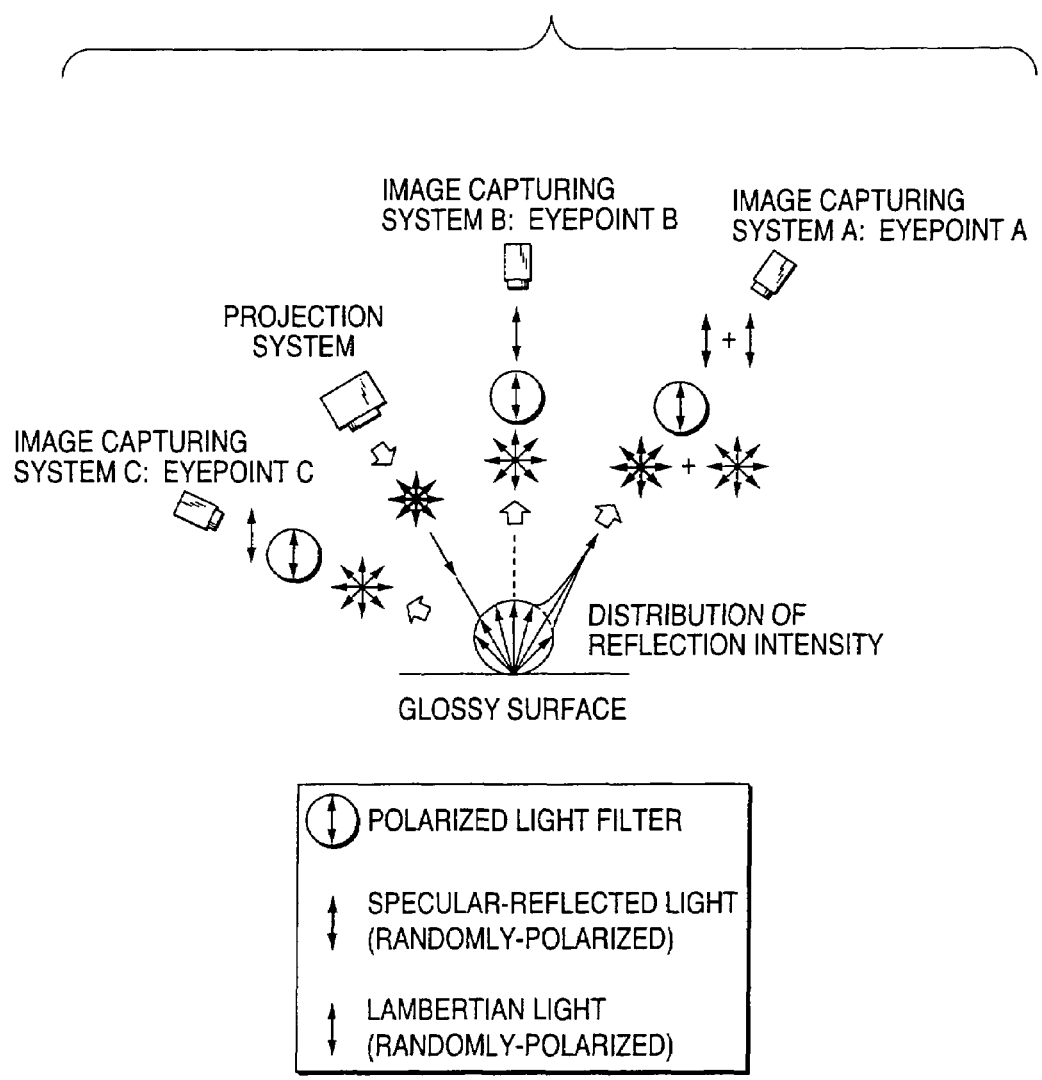
FIG. 22 is a view for describing that the related-art range finder causes deterioration in measurement when the object is glossy.
Figure 23:
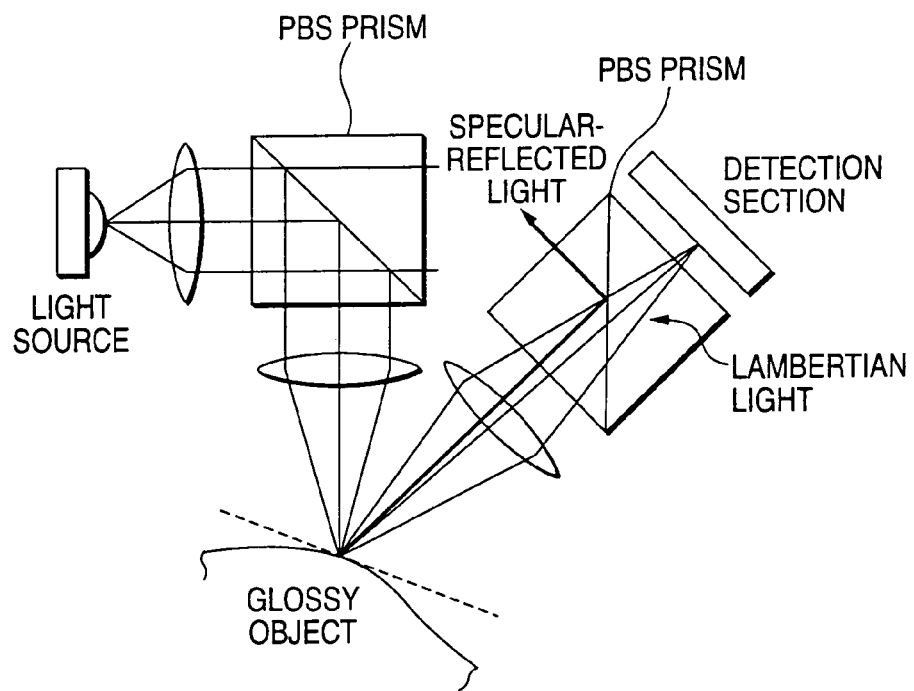
FIG. 23 is a view for describing a related-art geometry measurement device which does not cause deterioration in measurement when the object is glossy.

As is evident from the drawing, the PBS prism (the identical principal point arrangement unit 13) is disposed at the back of the imaging optical system 14. Hence, the PBS prism can be made smaller than a half mirror serving as the identical principal point arrangement unit of the related-art apparatus shown in FIG. 20.

FIG. 4 is a view showing the entire image of the range finder of the embodiment. Second image capturing unit 30 which is disposed at a position not optically identical with the principal point of the first image capturing unit 20 is added to the principal constituent elements shown in FIG. 1. A light-shaping optical system 16 is added to the projector unit 10. The encoded pattern light beam that has been polarized and converted is radiated from the projector unit 10 onto the object. An image reflected from the object is captured by the first image capturing unit 20 and the second image capturing unit 30.

The second image capturing unit 30 is constituted of a texture pattern image capturing section 31 for capturing a texture of the object and a reflected pattern image; an imaging optical system 32; and polarizing direction selection unit 33. A polarizing filter is used for the polarizing direction selection unit 33. The polarizing filter is equipped with a mechanism which is mounted on the imaging optical system 32 in the second image capturing unit 30 and can rotate about the optical axis of the imaging optical system 32.

An integrator rod and a capacitor lens are used for the light-shaping optical system 16 added to the projector unit 10. The integrator rod is a cylindrical optical member whose interior surface is formed into the shape of a specular surface. An improvement in a light condensing characteristic of the light-shaping optical system and irregularities in the optical intensity of the light source are diminished by combination of the integrator rod and the condenser lens.

Figure 9:
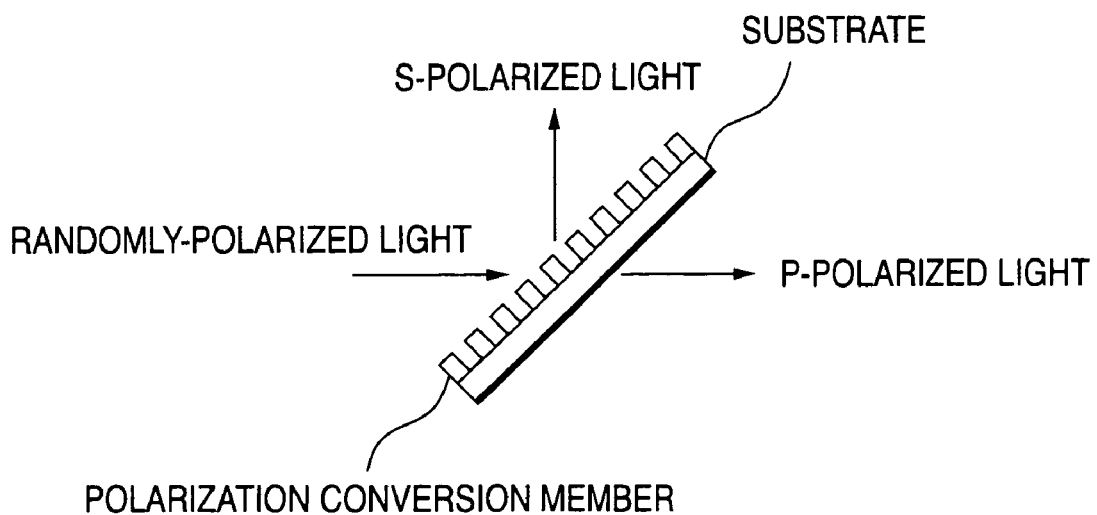
FIG. 9 is a view for describing an example of a plate-type BPS to be used in place of the PBS prism of Embodiment 1.

In the two embodiments that have been described thus far, a cube-type beam splitter (the PBS prism shown in FIG. 8) is used for the identical principal point arrangement unit. However, a plate-type beam splitter (shown in FIG. 9) having the polarization conversion function may also be used. When the plate-type beam splitter is used, a more compact, cheaper range finder can be embodied.

In the range finder of the invention having such a configuration, the encoded pattern that has been polarized and converted by the projector unit is projected on the object, and a pattern light beam on the object is observed through use of the first image capturing unit arranged at the principal point identical with that of the projector unit and the second image capturing unit arranged at a position not identical with the principal point of the projector unit.

A mechanism for diminishing measurement errors in the embodiment will now be described. First will be described a case where the object has a texture.

In view of the identical principal point, the stripe light beam observed by the first image capturing unit 30 is not disturbed by the shape of the object and is observed in the same manner in which the original projected stripe light beam is observed. Further, the stripe image captured by the first image capturing unit 20 and that captured by the second image capturing unit 30 include texture information about the object. Hence, there can be prevented occurrence of errors, which would otherwise be caused when corresponding points are extracted by comparison between the stripe images. Therefore, the influence of measurement deterioration attributable to the texture of the object can be diminished.

There will now be described a case where the object is glossy, by reference to FIG. 5.

In FIG. 5, linearly-polarized light is generated by means of the polarization conversion function of the identical principal point arrangement unit 13, and a plurality of encoded stripe light beams are projected onto the object (projected light beams: linealy-polarized light beams). A glossy surface is generally considered to be made by a convolution a specular surface and a lambertian surface. Hence, the reflected light corresponds to a sum of the specular-reflected light and the lambertian light. The specular-reflected light has a reflection intensity distribution deviated in the direction of regular reflection, and the lambertian light has a uniform reflection intensity distribution without deviation. Here, for the sake of simple explanation, the image capturing method of the second image capturing unit 30 will first be described. Subsequently, the first image capturing unit 20 will be described. Further, the second image capturing unit 30 is called a second image capturing unit 30-1 or second image capturing unit 30-2, depending on the eyepoint of the second image capturing unit 30.

When the second image capturing unit 30 is situated in the direction of regular reflection (corresponding to the second image capturing unit 30-1), the specular-reflected light reflected by a specular surface and the lambertian light that has been reflected by the lambertian surface travel toward the second image capturing unit 30. Since the polarized state of the light reflected by the specular surface is sustained, the specular-reflected light is linealy-polarized light which is identical with the projected light in terms of the polarizing direction. Further, the lambertian light that has been reflected by the lambertian surface turns into randomly-polarization light whose polarizing direction is not constant. Here, the transmission axis of the polarizing filter serving as polarizing direction selection unit 33 in the second image capturing unit 30 is rotationally adjusted so as to be essentially perpendicular to the polarizing direction of the linearly-polarized projected light beam. Thereby, the specular-reflected light is cut, and, among the lambertian light beams, only the light beam identical in direction with the transmission axis of the polarizing filter enters the second image capturing unit 30.

Next, when the second image capturing unit 30 is not situated in the direction of regular reflection (corresponding to the second image capturing unit 30-2), the lambertian light that has been reflected from the lambertian surface travels toward the second image capturing unit 30. The transmission axis of the polarizing filter serving as the polarizing direction selection unit 33 in the second image capturing unit 30 is rotationally adjusted so as to become essentially perpendicular to the polarizing direction of the linearly-polarized projected light, whereupon, from among the lambertian light, only the light identical in direction with the transmission axis of the polarizing filter beams enters the second image capturing unit 30.

Therefore, so long as the transmission axis of the polarizing filter is adjusted by using linealy-polarized light as projection light beams, the specular-reflected light can be eliminated regardless of the eyepoint of the second image capturing unit 30. Hence, a stripe light beam consisting of only the lambertian light can be observed.

When, as shown in FIG. 5, the comparatively-narrow intensity distribution of the specular-reflected light is not comparatively narrow (in the case of a glossy object having a strong characteristic of a specular finished surface) but shows a broad extension (in the case of a glossy object having a weak characteristic of a specular finished surface), the specular-reflected light may often be reflected even at the position of eyepoint of the second image capturing unit 30-2. However, even in such a case, the stripe light beam consisting of only the lambertian light can be observed, by means of adjusting the transmission axis of the polarizing filter so as to become essentially perpendicular to the polarizing direction of the linearly-polarized projected light.

Figure 6:
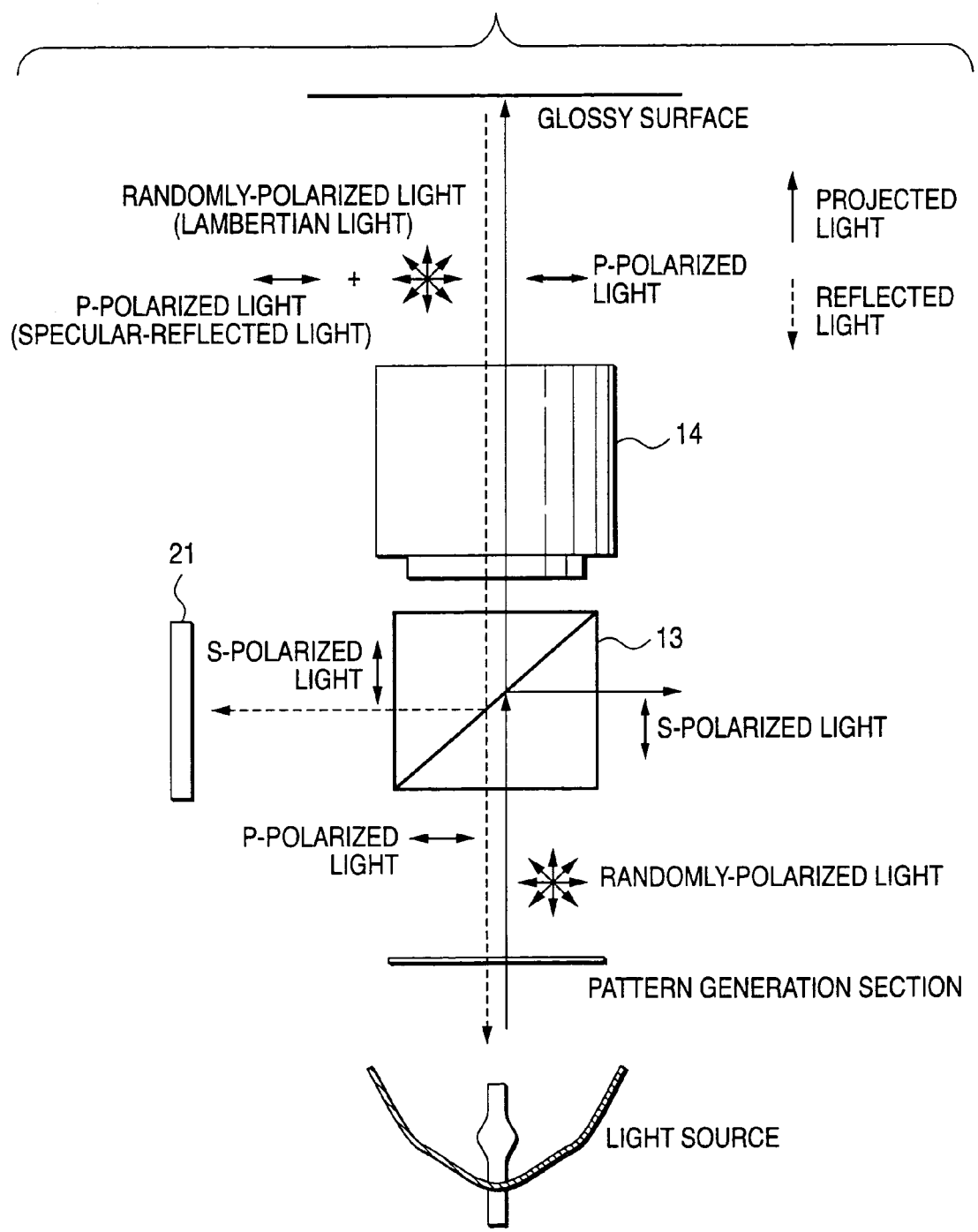
FIG. 6 is a view for describing that the first image capturing unit of Embodiment 1 can eliminate specular-reflected light.

FIG. 6 is a view for describing that the first image capturing unit 20 can eliminate the specular-reflected light and observe the strip light beam consisting of only the lambertian light.

The light (i.e., randomly-polarization light) originating from the light source turns into a plurality of encoded slit light beams after having passed through the pattern generation section, and the slit light beams enter the PBS prism serving as the identical principal point arrangement unit 13. As the randomly-polarization light is divided into polarization light P and polarization light S, both light beams being linearly polarized, by means of the PBS prism. Here, the polarization light P travels rectilinearly toward the object, and the polarization light S travels in the direction perpendicular to the direction of the polarization light P so as to depart from the texture pattern image capturing section 21. The encoded slit light beam consisting of the polarization light P is converged as an image on the glossy object by means of the imaging optical system. The light reflected from the glossy surface is formed from the specular-reflected light and the lambertian light for the same reason as that given for the second image capturing unit 30. The specular-reflected light and the lambertian light again enter the PBS prism by way of the imaging optical system. Since the specular-reflected light is polarization light P, the specular-reflected light travels toward the light source in view of the characteristic of the PBS prism. Since the lambertian light is randomly-polarization light, from among the lambertian light beams, the light having the same polarizing direction as that of the specular-reflected light (i.e., the polarization light P) travels toward the light source when lambertian light has entered the PBS prism. In contrast, only the light having a polarizing direction, the polarizing direction being perpendicular to the polarizing direction of the polarization light P but identical with that of the polarization light S, enters the texture pattern image capturing section 21. Since the texture pattern image capturing section 21 and the pattern generation section 12 are arranged on the same principal point, the reflected stripe image on the glossy surface is formed as an image on the texture pattern image capturing section 21. Therefore, the PBS prism can be imparted with the same function as that of the polarizing filter serving as the polarizing direction selection unit 33 in the second image capturing unit 30. Even the first image capturing unit 20 can eliminate the specular-reflected light reflected from the glossy surface, so that the stripe light beam consisting of only the lambertian light can be observed (although FIG. 5 shows a case where only the lambertian light enters the first image capturing unit, as a matter of course, even in this case the first image capturing unit observes the stripe light beams consisting of only the lambertian light).

As mentioned above, the first and second image capturing units 20, 30 can observe the stripe light beam consisting of only the lambertian light from which the specular-reflected light reflected from the glossy surface has been removed. Occurrence of erroneous correspondence, which would otherwise be caused when the stripe images captured by the first and second image capturing units 20, 30 are compared with each other, is inhibited, and as a result measurement precision is improved drastically.

Figure 7:
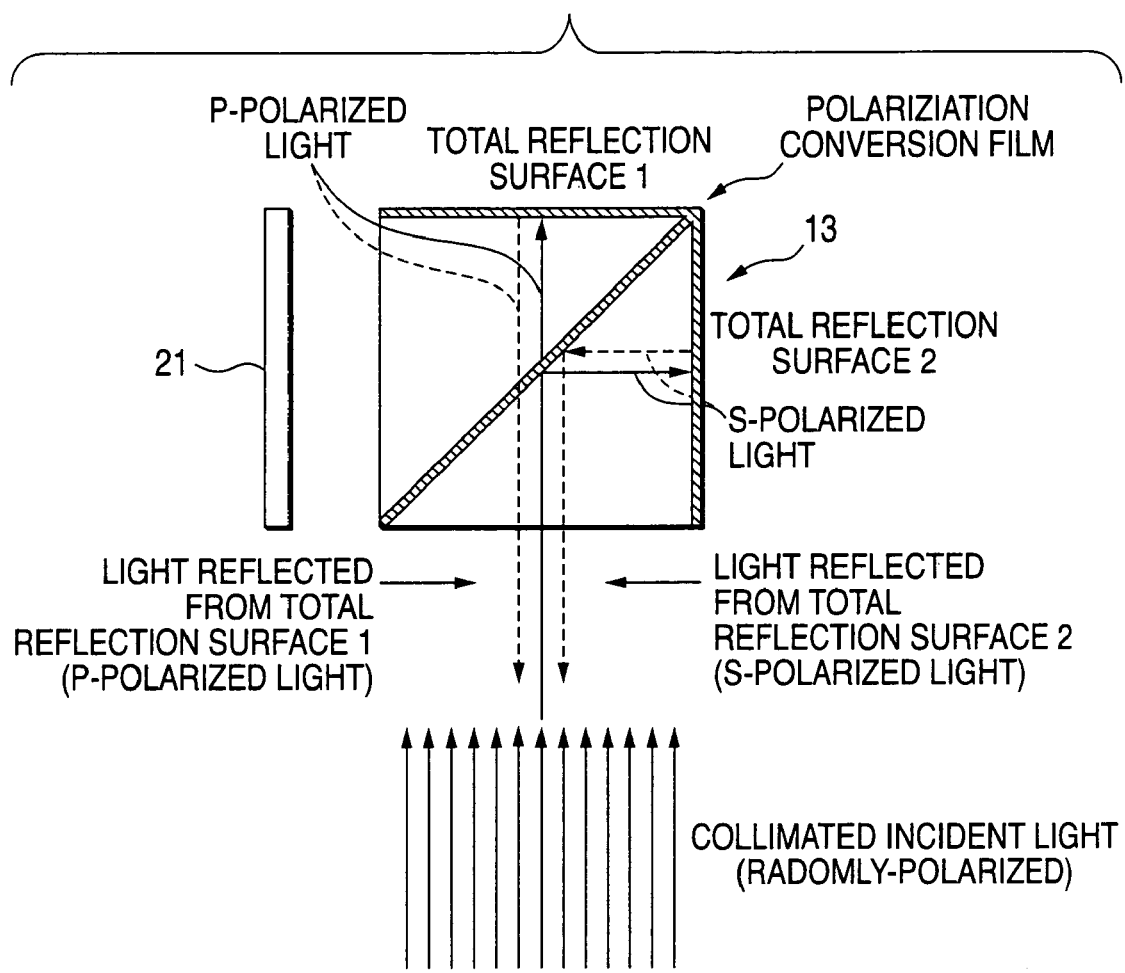
FIG. 7 is a block diagram for bringing the device of Embodiment 1 into an ideal state.

In the invention, collimation of the light entering the PBS prism is effective as means for embodying an idealistic state. An illustration for describing collimation of incident light is shown in FIG. 7. The collimated incident light (i.e., the randomly-polarization light) is separated into the polarization light P and the polarization light S by means of the PBS prism. The PBS prism has an incident-angle-dependent characteristic in connection with the polarization conversion function. As the incident angle with respect to the surface of the PBS on which the polarization conversion film is formed approaches an angle of 45°, the polarization light conversion efficiency can be made close to 100%. Therefore, so long as the incident light (randomly-polarization light) is collimated, the incident light can be converted into the polarization light P and the polarization light S most efficiently. As has been mentioned previously, the polarization light P travels rectilinearly and is projected onto the object (not shown) by way of the imaging optical system. The polarization light S travels at right angles to the traveling direction of the polarization light P so as to depart from the texture pattern image capturing section.

The polarization light P that has traveled rectilinearly undergoes total reflection on a total reflection surface 1 of the PBS prism, and the polarization light S nominally undergoes total reflection on a total reflection surface 2. The thus-totally-reflected light beams sustain their polarized states. The light reflected from the total reflection surface 1 still remains as the polarization light P and, hence, travels toward the light source while passing through the polarization conversion film. The light reflected from the total reflection surface 2 still remains as the polarization light S and, hence, is reflected by the polarization conversion film and travels toward the light source. Accordingly, the light beams (totally-reflected light beams) reflected by the total reflection surfaces 1, 2 do not enter the texture pattern image capturing section. Consequently, the totally-reflected light does not act as noise, and hence a high signal-to-noise ratio can be maintained.

As the light entering the PBS prism (i.e., the randomly-polarization light) deviates from an angle of 45° with respect to the surface having the polarization conversion film, the light traveling toward the object and the light traveling at right angles to the light are brought into a state in which the light beams contain a lot of randomly-polarization light beams. Therefore, the totally-reflected light also includes a lot of randomly-polarization light beams. A portion of the randomly-polarization light beams enter the texture pattern image capturing section, thereby significantly deteriorating the signal-to-noise ratio.

The total reflection surface of the PBS prism has been described herein. However, as a matter of course, totally-reflected light can be prevented by means of collimating the light entering a group of lenses constituting the imaging optical system.

Collimation of incident light is implemented through use of a parabolic reflector as a reflector of the light source; through use of a light-shaping optical system employing several types of lenses in combination; inserting a diaphragm at the point of pupil of the light-shaping optical system; or a combination thereof, as required. If a laser beam is combined with an expander and other optical elements, highly-accurate collimated light can be implemented.

Another means for implementing an ideal state includes narrowing the band of the light entering the PBS prism. The polarizing conversion efficiency of the PBS prism can be maximized by means of narrowing the band of the incident light and using a PBS prism corresponding to the band.

The present embodiment yields additional advantages provided below.

Since the projector unit 10 and the first image capturing unit 20 share the common imaging optical system, synchronous zooming operation of the optical system can be performed. An advantage of the common imaging optical system is now described in comparison with a related-art device having independent optical systems. When three-dimensional data pertaining to an object are desired to be acquired with high resolution or when an object is small, the image capturing system is zoomed in toward a telephoto position. In a case where optical systems are independent, a pitch between stripes becomes coarse. The optical system in the projection system must be adjusted to a telephoto position in accordance with the zooming ratio of the optical system in the image capturing system. In contrast, in the optical system of the present embodiment, the projection system is zoomed in toward the telephoto position in complete synchronization with the image capturing system being zoomed toward the telephoto position. A pitch between stripes to be captured becomes constant, and adjustment of the optical system in the projection system becomes obviated. When the zooming ratio of the optical system in the image capturing system has been changed, the position of the principal point in the optical system also moves. Hence, when the optical systems are independent, the projection and image capturing systems that have already been arranged must be re-adjusted such that the optical systems come to the positions of identical principal points. In contrast, in the optical system of the present embodiment, the imaging optical system is common. Hence, even when a zooming ratio has been changed, the position of the principal point shifts. However, a fixed positional relationship exists between the principal point of the projection system and that of the image capturing system. Hence, a necessity for adjustment to achieve the identical principal point is not required at all, and very excellent operability is attained.

In the present embodiment, another advantage is that the beam splitter serving as the identical principal point arrangement unit is disposed in back of the imaging optical system (i.e., at a position opposing the image capturing section) Therefore, when compared with a case where the related-art beam splitter is disposed in front of the imaging optical system (i.e., a position opposing the object), the position of the beam splitter becomes distant from the imaging position. Imaging of a stain in the beam splitter on the image capturing surface becomes more difficult, whereby the influence of a stain on measurement accuracy is diminished.

A pattern of the pattern generation section is projected onto an object in an enlarged manner. Hence, according to the present embodiment in which the beam splitter is disposed closer to the pattern generation section than is a beam splitter of the related-art range finder, the beam splitter can be made compact.

Further, as a result of the imaging optical system being shared, the number of optical systems can be reduced by one, thereby realizing a compact and inexpensive range finder.

The present embodiment enables acquisition of intensity data pertaining to the object, as well as geometrical measurement of the same. The device of the present embodiment enables acquisition of intensity data pertaining to the object while the texture of the object has been enhanced, by means of switching the projection light from encoded pattern light to white light or radiating optimal illuminating light through use of external lighting equipment. Either the first or second image capturing unit may be used as the image capturing unit. When the second image capturing unit is used, the polarizing filter may remain attached. However, when the texture of the object is desired to be expressed more realistically, an image is captured while the polarizing filter remains removed. As a result, acquisition of the intensity data as well as range data becomes feasible. Provision of data required at the time of production of three-dimensional contents—in which geometrical data pertaining to an object are displayed with intensity data being pasted thereto—also becomes possible. As a matter of course, intensity data may be acquired through use of image capturing unit other than the first and second image capturing units.

Figure 10:
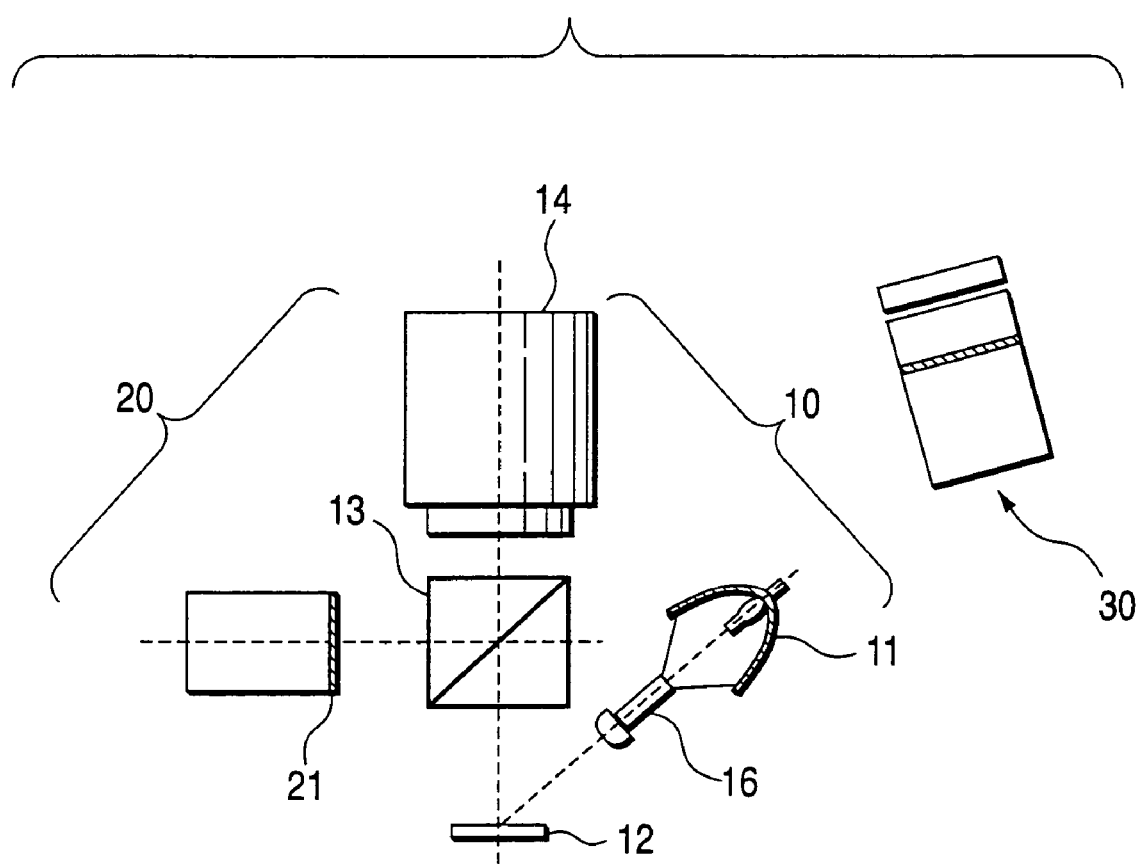
FIG. 10 is a view for describing a range finder according to Embodiment 2 of the invention.

Embodiment 2 of the invention will now be described. FIG. 10 is a view for describing a range finder of Embodiment 2 of the invention. Embodiment 2 is directed toward a configuration in which the light source 11, the light-shaping optical system 16, and a DMD (Digital Micro-mirror Device) are used for the projector unit 10. The DMD is an aggregate of small specular surface elements, and one specular surface element corresponds to one pixel. Each specular surface element can also change its inclination. Turning on/off of light can be performed on a per-pixel basis by means of causing light to fall on the specular surface element and controlling the inclination of the specular surface element. Halftone control required for encoding stripes is performed by means of controlling the number of times light is turned on and off. When the stripes are encoded with a color, there are employed means; for example, means for spinning a color wheel given colors, such as RGB, in front of the DMD in synchronism with turning on/off of light or preparing DMDs in advance for respective colors and subsequently effecting color composition through use of a cross prism. A detailed configuration example of the DMD is introduced in, e.g., "From ICs to DMDs (M. A. Mignardi, TI Technical Journal July–September, 1998, pp. 56 to 63). There is used a two-dimensional array, in which micro mirrors measuring tens of micrometers are arranged on a semiconductor chip on a scale of hundreds×hundreds. Each specular has a structure such that the specular can be inclined positively and negatively by means of a drive circuit provided below the specular. Illuminating light is caused to fall on the micro mirrors, and light is projected onto the screen in a desired pattern in accordance with angles of respective speculars. An example—in which a projector unit is constituted of a DMD, a desired stripe pattern is projected with high accuracy, and a three-dimensional image is formed by means of a spatial encoding technique—is described in detail in "Real-time 3D Shape Measurement with Digital Stripe Projection by Texas Instruments micro Mirror Devices DMD," (G. Frankowski et al., SPIE 3598 Feb. 2001, pp. 90 to 105). Here, a stripe pattern whose luminance changes continuously in the form of a sinusoidal waveform is projected with high accuracy by means of the DMD. Projecting operation involves pulsing action. Hence, the DMD is controlled in synchronism with the light-receiving action of the light-receiving element (CCD).

In FIG. 10, elements which correspond to those elements shown in FIG. 4 are assigned corresponding reference numerals, and their detailed explanations are omitted. The Embodiment 2 also yields the same advantages as those yielded by the Embodiment 1.

Embodiment 3 of the invention will now be described. As shown in FIG. 11, Embodiment 3 is directed toward a range finder having a cover member 40 provided so as to enclose the projector unit 10 and the first image capturing unit 20 in addition to adopting the same configuration as that of Embodiment 1. Embodiment 3 also yields an advantage of ability to prevent occurrence of a stain in the optical system or the like, in addition to yielding the same advantage as that of Embodiment 1. Since, as mentioned previously, a compact device is embodied, the small cover member 40 can be used. In FIG. 11 as well, elements which correspond to those shown in FIG. 4 are assigned the same reference numerals.

Figure 12:
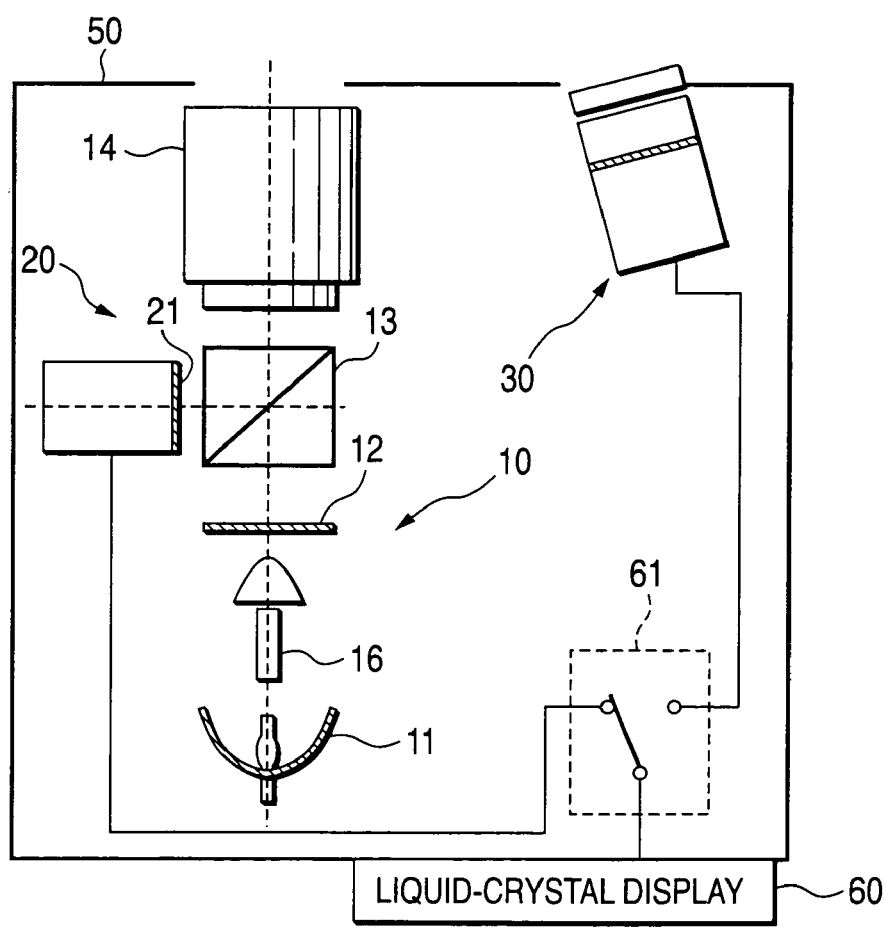
FIG. 12 is a view for describing a three-dimensional image camera according to Embodiment 4 of the invention.

Embodiment 4 of the invention will now be described. As shown in FIG. 12, according to Embodiment 4, there is provided a housing 50 for holding the projector unit 10, first image capturing unit 20, the second image capturing unit 30, or the like, thereby realizing a device which operates as a compact, portable camera for three-dimensional image capturing use (which can also be called a three-dimensional image camera, or a 3D camera). In the embodiment shown in FIG. 12, the image capturing data output from the second image capturing unit 30 or the first image capturing unit 20 can be supplied to a liquid-crystal display 60 by way of a switch 61 and monitored while the second image capturing unit 30 or the first image capturing unit 20 is used as a monitor for intensity data. As a matter of course, optical monitoring may be effected by means of providing an additional imaging optical system. When an image is captured, the pattern image is projected, thereby acquiring a range image. Subsequently, projection of the pattern image is stopped, and intensity data are acquired from the first image capturing unit 20 or the second image capturing unit 30. In this case, when a sufficient amount of light cannot be acquired, uniform white light can be projected form the light source 11. In FIG. 12 as well, elements which correspond to those shown in FIG. 4 are assigned the same reference numerals.

Figure 13:
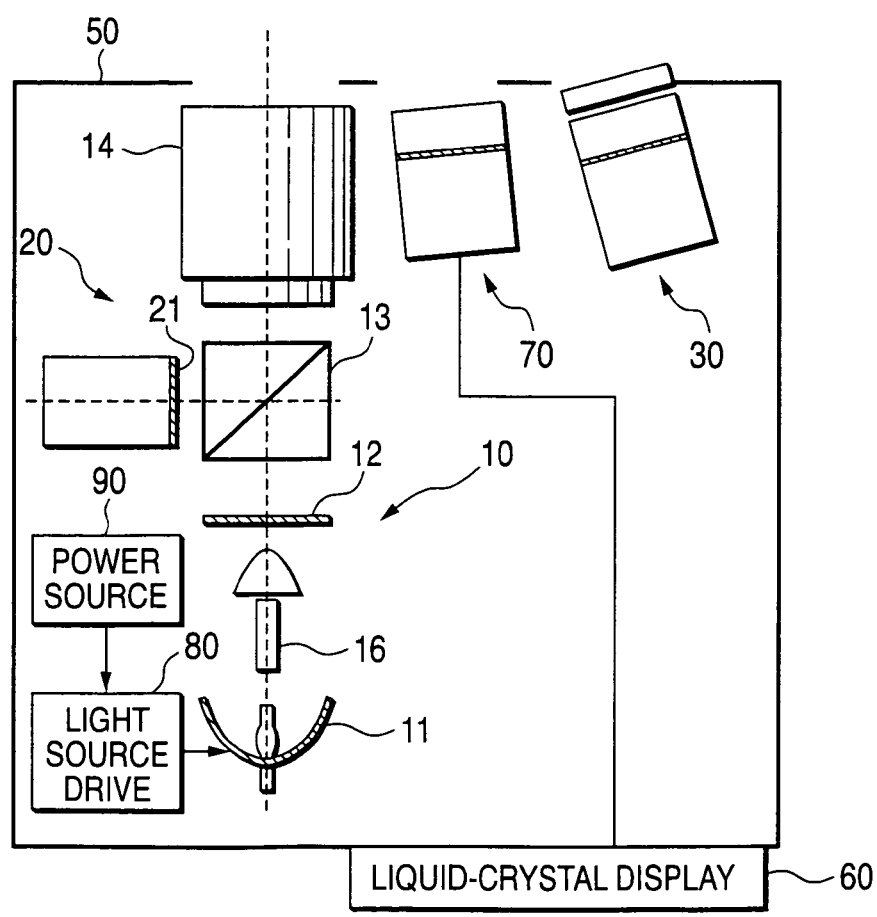
FIG. 13 is a view for describing a three-dimensional image camera according to Embodiment 5 of the invention.

Embodiment 5 of the invention will now be described. As shown in FIG. 13, Embodiment 5 is provided with third image capturing unit 70 having the functions of monitoring and acquiring intensity data. An infrared light image capturing element (a CCD having sensitivity in the range of infrared light or the like) is used as the first image capturing unit 20 and the second image capturing unit 30, and pattern light consisting of infrared light is projected from the light source 11. By means of such a configuration, acquisition of a range image performed by the first image capturing unit 20 and the second image capturing unit 30 and acquisition of intensity data performed by the third image capturing unit 70 can be performed simultaneously. A light source drive section 80 preferably performs flashing operation rather than being continuously activated. As a result, consumption of power of a power source 90 can be curbed, and the range finder becomes easily operative as a three-dimensional camera which can be used for a purpose that requires portability. In FIG. 13 as well, elements which correspond to those shown in FIGS. 4 and 12 are assigned the same reference numerals.

A sixth embodiment will now be described. The previously-described Embodiments 1 through 5 have used a polarized beam splitter as the identical principal point arrangement unit and have utilized a polarization light converting function and a polarization light direction selection function, both belonging to the beam splitter. However, when the gloss of the object does not present any significant problem or when means for solving a problem related to a gloss is additionally adopted, the polarization light converting function and the polarization light direction selection function can be omitted. Subsequent embodiments employ identical principal point arrangement unit which does not have any polarization light converting function or polarization light direction selection function.

Figure 14:
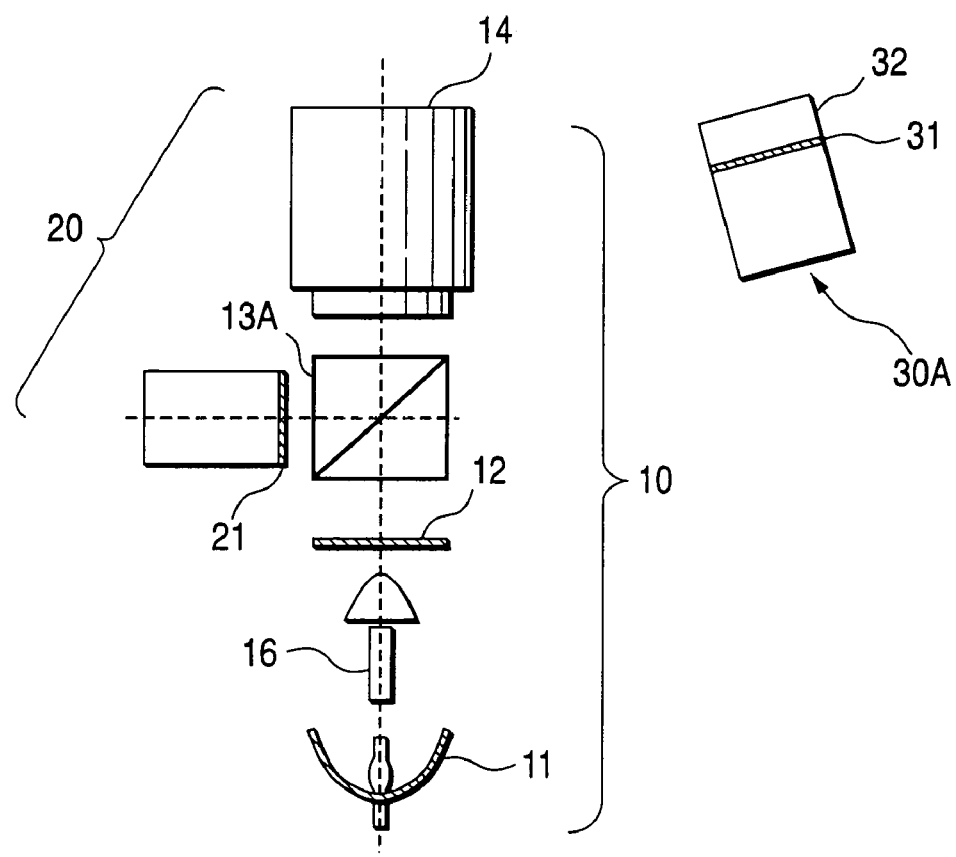
FIG. 14 is a view for describing a range finder according to Embodiment 6 of the invention.

FIG. 14 shows a range finder of Embodiment 6. In the drawing, elements which correspond to those shown in FIG. 4 are assigned corresponding reference numerals. The present embodiment employs a beam splitter (of cube or plate type) as identical principal point arrangement unit 13A. Second image capturing unit 30A has the texture pattern image capturing section 31 and the imaging optical system 32. However, the image capturing unit 30A is not provided with the polarizing direction selection unit (indicated by reference numeral 33 in FIG. 4).

Even in the range finder of Embodiment 6, the stripe images captured by the first image capturing unit 20 and the second image capturing unit 30A include texture data pertaining to the object. Hence, when corresponding points are extracted through comparison between the stripe images, occurrence of an error can be inhibited. Therefore, the influence of measurement deterioration attributable to the texture of the object can be lessened.

When the image capturing system is zoomed toward the telephoto position, the projection system is also zoomed toward the telephoto position in perfect synchronization. Accordingly, a pitch between stripes to be captured becomes fixed, and adjustment of the optical system in the projection system becomes unnecessary. Moreover, the imaging optical system 14 is shared. Therefore, even when the zooming ratio has been changed, the position of the principal point also moves. However, the fixed positional relationship exists between the principal point of the projection system and that of the image capturing system. Hence, a necessity for adjustment to achieve the identical principal point is not required at all, and very excellent operability is attained.

The beam splitter (i.e., the identical principal point arrangement unit 13A) is disposed in back of the imaging optical system 14 (i.e., at a position opposing the image capturing section). Therefore, when compared with a case where the related-art beam splitter is disposed in front of the imaging optical system (i.e., a position opposing the object), the position of the beam splitter becomes distant from the imaging position. Imaging of a stain in the beam splitter on the image capturing surface becomes more difficult, whereby the influence of a stain on measurement accuracy is diminished.

A pattern of the pattern generation section is projected onto the object in an enlarged manner. Hence, according to the present embodiment in which the beam splitter is disposed closer to the pattern generation section than is a beam splitter of the related-art range finder, the beam splitter can be made compact.

Further, as a result of the imaging optical system being shared, the number of optical systems can be reduced by one, thereby realizing a compact and inexpensive range finder.

Embodiment 6 also enables acquisition of intensity data pertaining to the object as well as geometrical measurement of the same. The device of the present embodiment enables acquisition of intensity data pertaining to the object while the texture of the object has been enhanced, by means of switching the projection light from encoded pattern light to white light or radiating optimal illuminating light through use of external lighting equipment. Either the first or second image capturing unit may be used as the image capturing unit. Alternatively, separate image capturing unit may be prepared. As a result, intensity data as well as range data can be acquired. Provision of data required at the time of production of three-dimensional contents—in which geometrical data pertaining to an object are displayed while being pasted with intensity data—also becomes possible.

Figure 15:
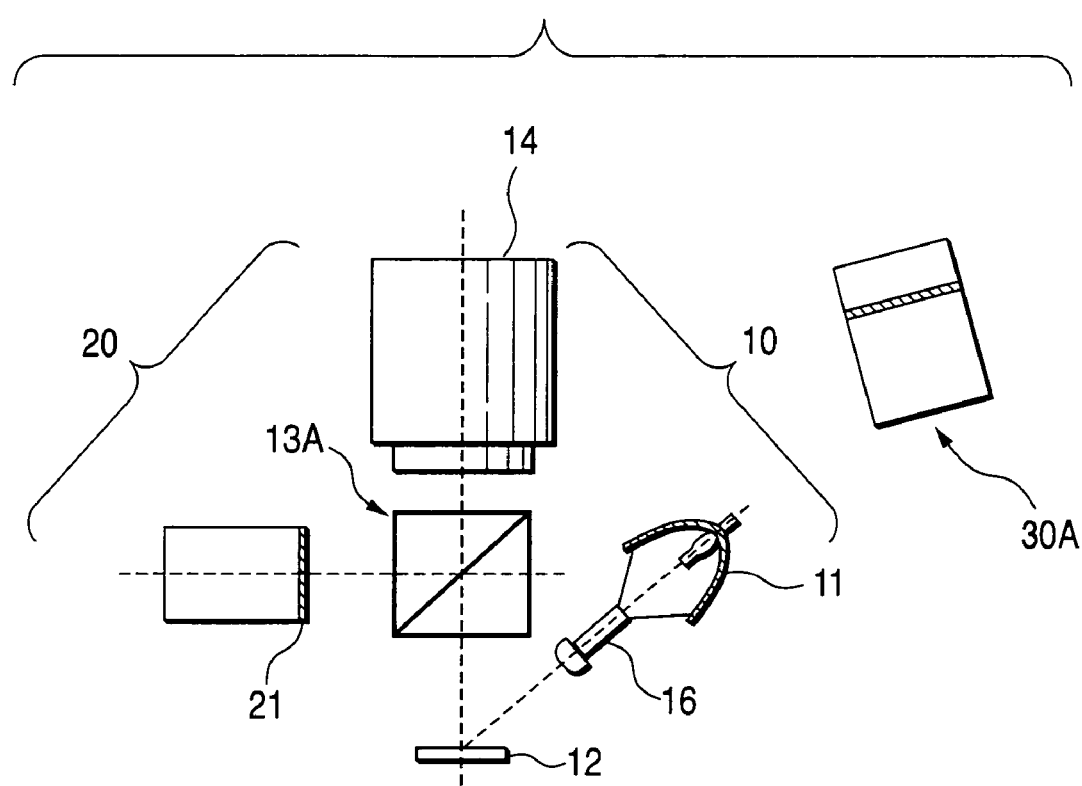
FIG. 15 is a view for describing a range finder according to Embodiment 7 of the invention.

Embodiment 7 of the invention will now be described. FIG. 15 is a view for describing a range finder of Embodiment 7 of the invention. Embodiment 7 adopts the same basic configuration as that employed by Embodiment 6. In addition, the light source 11, the light-shaping optical system 16, and the DMD serving as the pattern generation section 12 are used for the projector unit 10.

In FIG. 15, elements which correspond to those shown in FIG. 14 are assigned the same reference numerals, and detailed explanations thereof are omitted. Embodiment 7 also yields the same advantage as that yielded by Embodiment 6.

Embodiment 8 of the invention will now be described. As shown in FIG. 16, Embodiment 8 is arranged such that the cover member 40 is provided so as to encircle the projector unit 10 and the first image capturing unit 20, to thus prevent staining of the optical systems or the like. As mentioned previously, since miniaturization is achieved, the cover member 40 can be made small. In FIG. 16, elements which correspond to those shown in FIG. 14 are assigned the same reference numerals.

Figure 17:
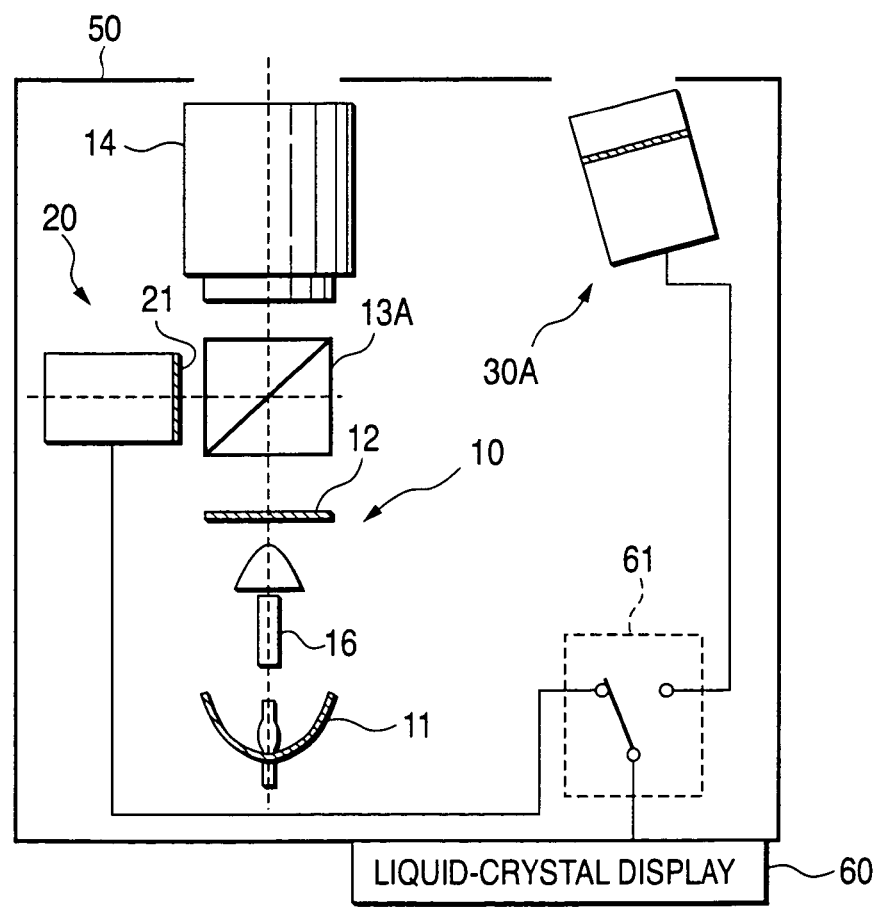
FIG. 17 is a view for describing a three-dimensional image camera according to Embodiment 9 of the invention.

Embodiment 9 of the invention will now be described. As shown in FIG. 17, Embodiment 9 is provided with the housing 50 for holding the projector unit 10, first image capturing unit 20, the second image capturing unit 30, or the like, thereby realizing a device which operates as a compact, portable camera for three-dimensional image capturing use (which can also be called a three-dimensional image camera, or a 3D camera). In Embodiment 9, the image capturing data output from the second image capturing unit 30 or the first image capturing unit 20 can be supplied to the liquid-crystal display 60 by way of a switch 61 and monitored while the second image capturing unit 30 or the first image capturing unit 20 is used for monitoring intensity data. As a matter of course, optical monitoring may be effected by means of providing an additional imaging optical system. When an image is captured, the pattern image is projected, thereby acquiring a range image. Subsequently, projection of the pattern image is stopped, and intensity data are acquired from the first image capturing unit 20 or the second image capturing unit 30. In this case, when a sufficient amount of light cannot be acquired, uniform white light can be projected from the light source 11. In FIG. 17 as well, those elements which correspond to those shown in FIG. 14 are assigned the same reference numerals.

Figure 18:
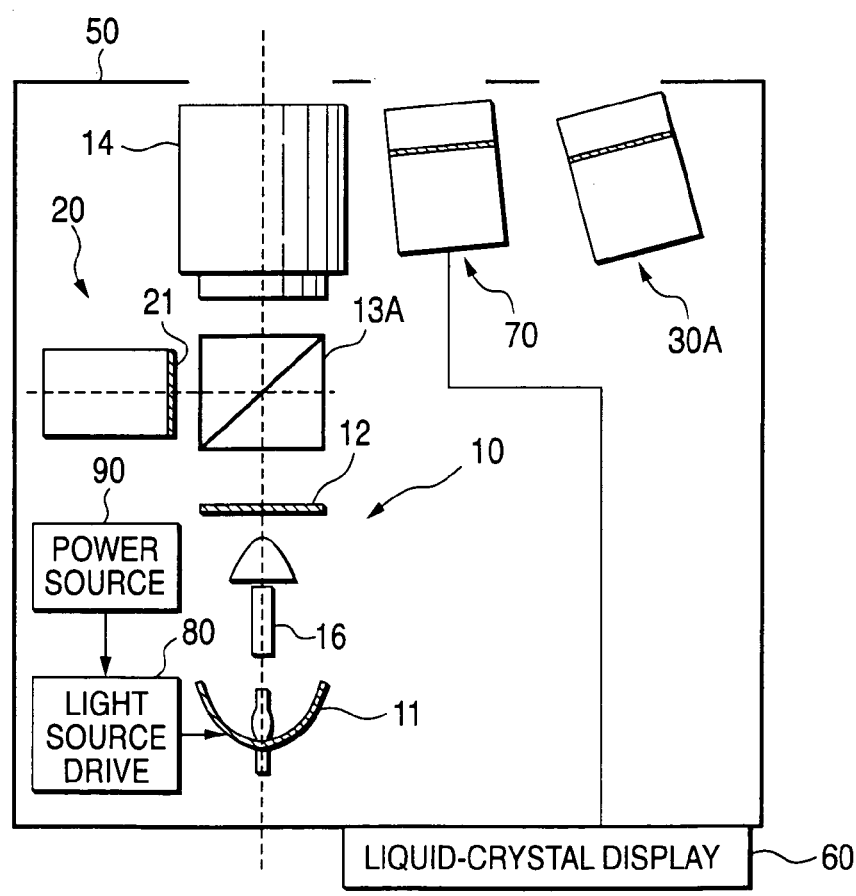
FIG. 18 is a view for describing a three-dimensional image camera according to Embodiment 10 of the invention.
Figure 19:
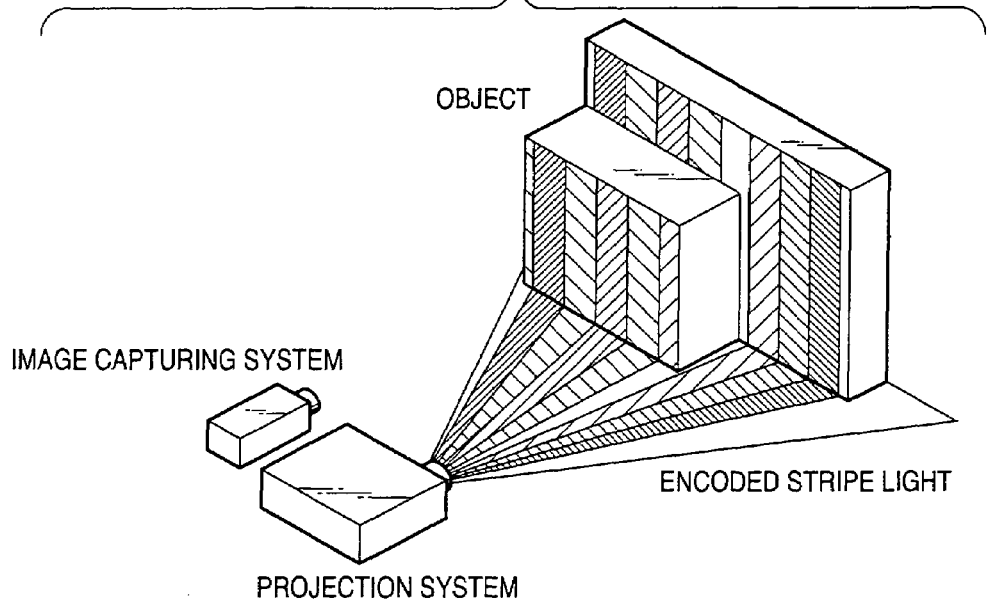
FIG. 19 is a view for describing the configuration of a related-art range finder.

Embodiment 10 of the invention will now be described. As shown in FIG. 18, Embodiment 10 is provided with the third image capturing unit 70 having the functions of monitoring and acquiring intensity data. An infrared light image capturing element (a CCD having sensitivity in the range of infrared light or the like) is used as the first image capturing unit 20 and the second image capturing unit 30, and pattern light consisting of infrared light is projected from the light source 11. With such a configuration, acquisition of a range image performed by the first image capturing unit 20 and the second image capturing unit 30 and acquisition of intensity data performed by the third image capturing unit 70 can be performed simultaneously. The light source drive section 80 preferably performs flashing operation rather than being continuously activated. As a result, consumption of power of the power source 90 can be curbed, and the range finder becomes easily operative as a three-dimensional camera which can be used for a purpose which requires portability. In FIG. 18 as well, elements which correspond to those shown in FIG. 14 are assigned the same reference numerals.

According to the three-dimensional image capturing technique of the invention, even when an object has a texture, errors in measurement can be diminished, thereby improving ease of zooming operation and realizing a compact device. Range data as well as intensity data can be collectively acquired. Further, even when the object is glossy, errors in measurement can be diminished.

The invention can be implemented not only as a device or system but also as a method. As a matter of course, a part of such an invention can be configured as software. Naturally, a software product used for causing a computer to execute the software also falls within the technical scope of the invention.

The invention is not limited to the above-described embodiments and is susceptible to various modifications within the scope of the invention.

What is claimed is:

1. A range finder for measuring a three-dimensional geometry of an object, comprising:
   a projector unit for projecting pattern light onto the object;
   a first image capturing unit for capturing an image reflected from the object;
   a second image capturing unit for capturing an image reflected from the object;
   an identical principal point arrangement unit; and
   an imaging optical system; wherein
   the second image capturing unit is arranged so as to assume a principal point optically differing from that of the first image capturing unit;
   the identical principal point arrangement unit arranges the projector unit and the first image capturing unit at a position of an optically identical principal point;
   the imaging optical system is shared between the projector unit and the first image capturing unit; and
   the imaging optical system has a zooming unit and is configured such that a fixed positional relationship exists between the principal point of the projector unit and that of the image capturing system when a zooming ratio has been changed by the zooming unit.

2. The range finder according to claim 1,
   wherein the projector unit has a light source, a pattern generation section, the identical principal point arrangement unit, and the imaging optical system.

3. The range finder according to claim 1,
   wherein the projector unit has a light source, a light-shaping optical system, a pattern generation section, the identical principal point arrangement unit, and the imaging optical system.

4. The range finder according to claim 1,
   wherein the first image capturing unit has a texture pattern image capturing section for capturing a texture of the object and a reflected pattern image, the identical principal point arrangement unit, and the imaging optical system.

5. The range finder according to claim 1,
   wherein the second image capturing unit has a texture pattern image capturing section for capturing a texture of the object and a reflected pattern image, and the imaging optical system.

6. The range finder according to claim 1,
   wherein the pattern light is formed from an encoded stripe light.

7. The range finder according to claim 2,
   wherein the projector unit has a pattern generating the pattern light; and
   the pattern generating section includes a liquid-crystal panel.

8. The range finder according to claim 2,
   wherein the projector unit has a pattern generating section for generating the pattern light; and
   the pattern generation includes a digital micro-mirror device.

9. The range finder according to claim 2,
   wherein the projector unit has a pattern generating section for generating the pattern light; and
   the pattern generation section includes a transmitted film.

10. The range finder according to claim 1, further comprising:
a cover member for shielding at least the imaging optical system and the identical principal point arrangement unit in an area where the cover member does not hinder projection of reflected light onto the first image capturing unit and the second image capturing unit.

11. The range finder according to claim 1,
wherein the imaging optical system is disposed closer to the object than is the identical principal point arrangement unit.

12. The range finder according to claim 1,
wherein the identical point arrangement unit includes a plate-type beam splitter.

13. The range finder according to claim 1,
wherein the identical point arrangement unit includes a cube-type beam splitter.

14. A three-dimensional image capturing method, employing: a projector unit for projecting pattern light onto an object; a first image capturing unit for capturing an image reflected from the object; a second image capturing unit for capturing an image reflected from the object; an identical principal point arrangement unit; and an imaging optical system; wherein the second image capturing unit is arranged so as to assume a principal point optically differing from that of the first image capturing unit; the identical principal point arrangement unit arranges the projector unit and the first image capturing unit at the position of an optically identical principal point; the imaging optical system is shared between the projector unit and the first image capturing unit; and the imaging optical system has a zooming unit; the method comprising: projecting the pattern light projected by the projector unit onto the object; capturing an image of the reflected light with the first and second image capturing units; measuring a three-dimensional geometry on the basis of a reflected image of the object acquired by the first image capturing unit and a reflected image of the object acquired by the second image capturing unit; and fixing a positional relationship between the principal point of the projector unit and that of the image capturing system when a zooming ratio has been changed by the zooming unit.

15. A three-dimensional image camera for measuring a three-dimensional geometry of an object, comprising:
a projector unit for projecting pattern light onto the object;
a first image capturing unit for capturing an image reflected from the object;
a second image capturing unit for capturing an image reflected from the object;
an identical principal point arrangement unit;
an imaging optical system; and
a housing; wherein
the second image capturing unit is arranged so as to assume a principal point optically differing from that of the first image capturing unit;
the identical principal point arrangement unit arranges the projector unit and the first image capturing unit at the position of an optically identical principal point;
the imaging optical system is shared between the projector unit and the first image capturing unit; and
the housing mounts the projector unit, the first image capturing unit, and the second image capturing unit; and
a third image capturing unit for capturing the object in a visible light range; wherein
the projector unit projects infrared light as pattern light;
the first and second image capturing units acquire a reflected image of infrared light, to measure a three-dimensional geometry of the object; and
the third image capturing unit acquires intensity data pertaining to the object.

16. The three-dimensional image camera according to claim 15,
wherein the projector unit projects flashing light.

17. The three-dimensional image camera according to claim 15,
wherein the projector unit can project non-pattern light on the object; and
the first or second image capturing unit captures an image of non-pattern light reflected from the object, to acquire intensity data pertaining to the object.

18. The three-dimensional image camera according to claim 15,
wherein range data and intensity data pertaining to the object are simultaneously acquired, by simultaneously acquiring reflection data pertaining to the infrared light and intensity data pertaining to the object.

19. The three-dimensional image camera according to claim 15,
wherein the imaging optical system is disposed closer to the object than is the identical principal point arrangement unit.

20. A range finder for measuring a three-dimensional geometry of an object, comprising:
a projector unit for projecting pattern light onto the object;
a first image capturing unit for capturing an image reflected from the object;
a second image capturing unit for capturing an image reflected from the object;
an identical principal point arrangement unit; and
an imaging optical system; wherein
the second image capturing unit is arranged so as to assume a principal point optically differing from that of the first image capturing unit;
the identical principal point arrangement unit arranges the projector unit and the first image capturing unit at the position of an optically identical principal point;
the imaging optical system is shared between the projector unit and the first image capturing unit;
the imaging optical system has zooming unit and is configured such that a fixed positional relationship between the principal point of the projector unit and that of the image capturing system exists when a zooming ratio has been changed by the zooming unit;
the identical principal point arrangement unit further has a polarization conversion function for converting light originating from the projector unit into polarization light, and a polarization light direction selection function for selecting; and
light to be guided to the first image capturing unit is selected from among light reflected from the object by the polarization conversion function.

21. The range finder according to claim 20,
wherein the identical principal point arrangement unit includes a polarization light beam splitter having a plate-type or cube-type geometry.

22. The range finder according to claim 20,
wherein the second image capturing unit has a texture pattern image capturing section for capturing a texture of the object and a reflected pattern image, an imaging optical system, and a polarizing direction selection unit; and light to be guided to the second image capturing unit is selected from among light reflected from the object by the polarization direction selection unit.

23. The range finder according to claim 22, wherein the polarizing direction selection unit of the second image capturing unit has an angle adjustment function for relatively changing an angle of polarizing direction selected by the polarizing direction relative to a polarizing direction of polarization light which has undergone polarization conversion performed by the polarization conversion function of the identical principal point arrangement unit.

24. The range finder according to claim 20, wherein light enters the identical principal point arrangement unit having the polarization conversion function and the polarizing direction selection function; and the light is substantially collimated light.

25. A three-dimensional image capturing method, employing: a projector unit for projecting pattern light onto an object; a first image capturing unit for capturing an image reflected from the object; a second image capturing unit for capturing an image reflected from the object; an identical principal point arrangement unit; and an imaging optical system; wherein the second image capturing unit is arranged so as to assume a principal point optically differing from that of the first image capturing unit; the identical principal point arrangement unit arranges the projector unit and the first image capturing unit at the position of an optically identical principal point; the imaging optical system is shared between the projector unit and the first image capturing unit; and the imaging optical system has a zooming unit; the method comprising: converting light originating from the projector unit into polarization light by a polarization conversion function of the identical principal point arrangement unit; selecting a first light from among light reflected from the object, the first light being guided to the first image capturing unit by a polarization direction selection function provided in the identical principal point arrangement unit; selecting a second light from among light reflected from the object, the second light being guided to the second image capturing unit by a polarization direction selection unit provided in the second image capturing unit; measuring a three-dimensional geometry on the basis of a reflected image of the object acquired by the first image capturing unit and a reflected image of the object acquired by the second image capturing unit; and fixing a positional relationship between the principal point of the projector unit and that of the image capturing system when a zooming ratio has been changed by the zooming unit.

26. A three-dimensional image camera for measuring a three-dimensional geometry of an object, comprising:
a projector unit for projecting pattern light onto the object;
a first image capturing unit for capturing an image reflected from the object;
a second image capturing unit for capturing an image reflected from the object;
an identical principal point arrangement unit;
an imaging optical system;
a housing; wherein
the second image capturing unit is arranged so as to assume a principal point optically differing from that of the first image capturing unit;
the identical principal point arrangement unit arranges the projector unit and the first image capturing unit at the position of an optically identical principal point;
the imaging optical system is shared between the projector unit and the first image capturing unit;
the housing mounts the projector unit, the first image capturing unit, and the second image capturing unit;
the identical principal point arrangement unit further has a polarization conversion function for converting light originating from the projector unit into polarization light, and a polarization light direction selection function; and
light to be guided to the first image capturing unit is selected from among light reflected from the object by the polarization light direction selection function; and
a third image capturing unit for capturing the object in a visible light range; wherein
the projector unit projects infrared light as pattern light;
the first and second image capturing units acquire a reflected image of infrared light, to measure a three-dimensional geometry of the object; and
the third image capturing unit acquires intensity data pertaining to the object.

27. The three-dimensional image camera according to claim 26, wherein the projector unit projects flashing light.

28. The three-dimensional image camera according to claim 26, wherein the projector unit can project non-pattern light on the object; and
the first or second image capturing unit captures an image of non-pattern light reflected from the object, to acquire intensity data pertaining to the object.

29. The three-dimensional image camera according to claim 26, wherein range data and intensity data pertaining to the object are simultaneously acquired, by simultaneously acquiring reflection data pertaining to the infrared light and intensity data pertaining to the object.

30. The three-dimensional image camera according to claim 26, wherein the imaging optical system is disposed closer to the object than is the identical principal point arrangement unit.

* * * * *